United States Patent [19]
Alderfer

[11] 3,803,965
[45] Apr. 16, 1974

[54] APPARATUS FOR PRODUCING REINFORCED FABRIC

[75] Inventor: Sterling W. Alderfer, Akron, Ohio

[73] Assignee: The Steelastic Company, Akron, Ohio

[22] Filed: May 24, 1972

[21] Appl. No.: 256,472

[52] U.S. Cl............................. 83/155, 83/276, 83/451
[51] Int. Cl............................. B26d 5/22, B65h 17/36
[58] Field of Search ............. 83/276, 277, 112, 155, 83/451

[56] References Cited
UNITED STATES PATENTS

| | | | |
|---|---|---|---|
| 3,566,733 | 3/1971 | McClean | 83/277 X |
| 3,112,665 | 12/1963 | Hansel et al. | 83/277 X |
| 1,609,654 | 12/1926 | Makowski | 83/277 X |
| 1,423,798 | 7/1922 | Hennessy | 83/277 |
| 3,496,811 | 2/1970 | Flanagan et al. | 83/277 X |
| 3,483,779 | 12/1969 | Forthmann, Jr. | 83/276 X |
| 3,170,353 | 2/1965 | Wheeler et al. | 83/276 |
| 2,425,994 | 8/1947 | Chilton | 83/277 X |

Primary Examiner—J. M. Meister
Attorney, Agent, or Firm—Hamilton, Renner & Kenner

[57] ABSTRACT

The subject disclosure is directed to a method and apparatus for making reinforced fabric. A reinforcement is encapsulated within a ribbon of uncured elastomeric material. The ribbon is preliminarily oriented on a lead-in table, and a shuttle head translates longitudinally of itself from a position over an assembly table to a position over the lead-in table. The lead-in table is then raised to place the ribbon in juxtaposition with the shuttle head. After positively gripping the ribbon the shuttle head translates to a position over the assembly table—thereby metering a strip of ribbon having a predetermined length—and then lowers accurately to deposit the strip on the assembly table. A guillotine means severs the strip from the ribbon, and the assembly table indexes the strip so that the successively deposited strips are stitched to the immediately preceding strip. The resulting belt of fabric has the reinforcement therein oriented at a preselected bias because the assembly table may be selectively oriented with respect to the fixedly oriented lead-in table, shuttle head and guillotine means.

17 Claims, 30 Drawing Figures

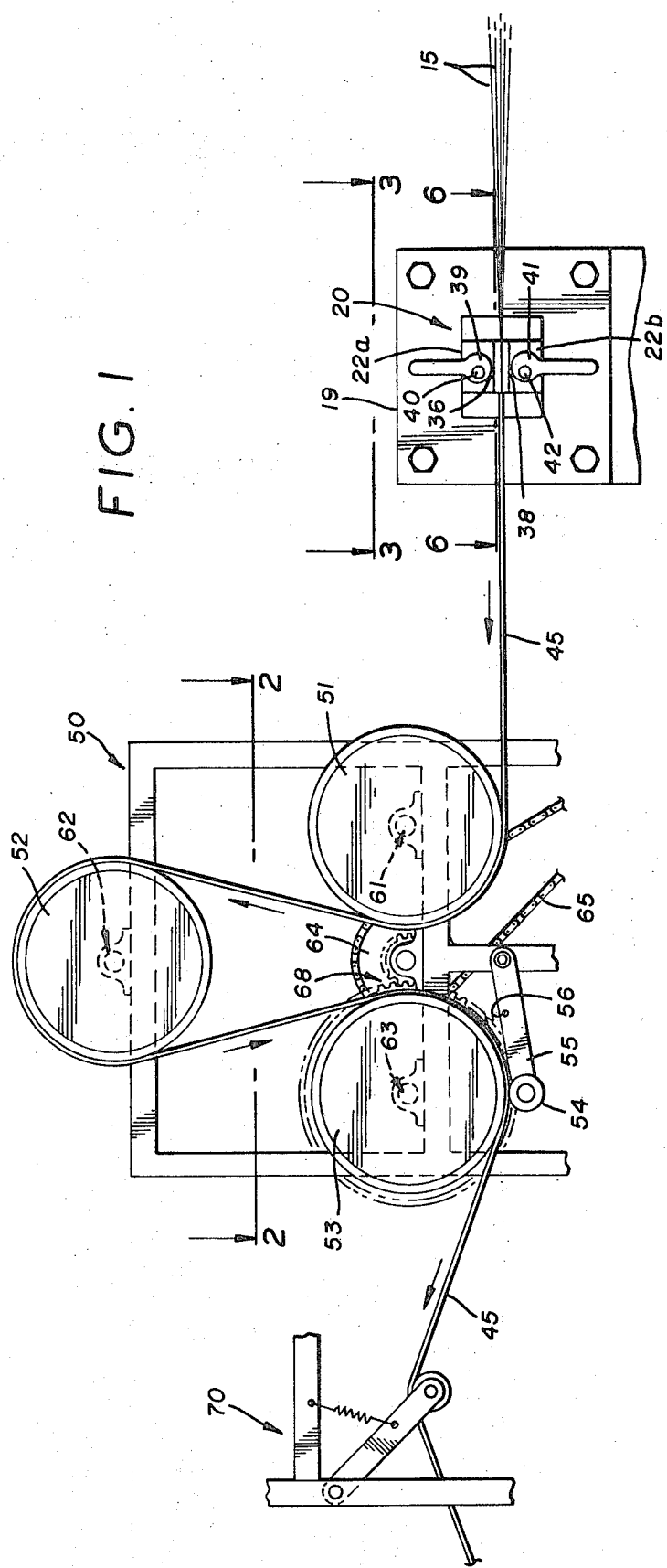
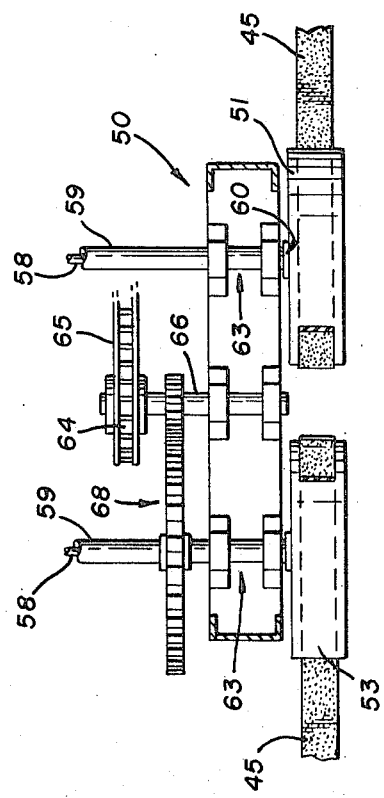
FIG. 1
FIG. 2

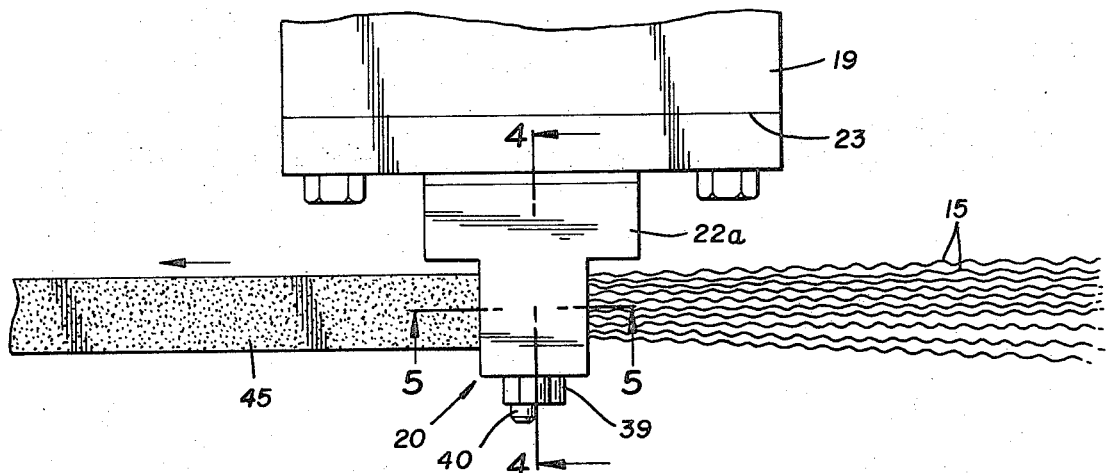
FIG. 3
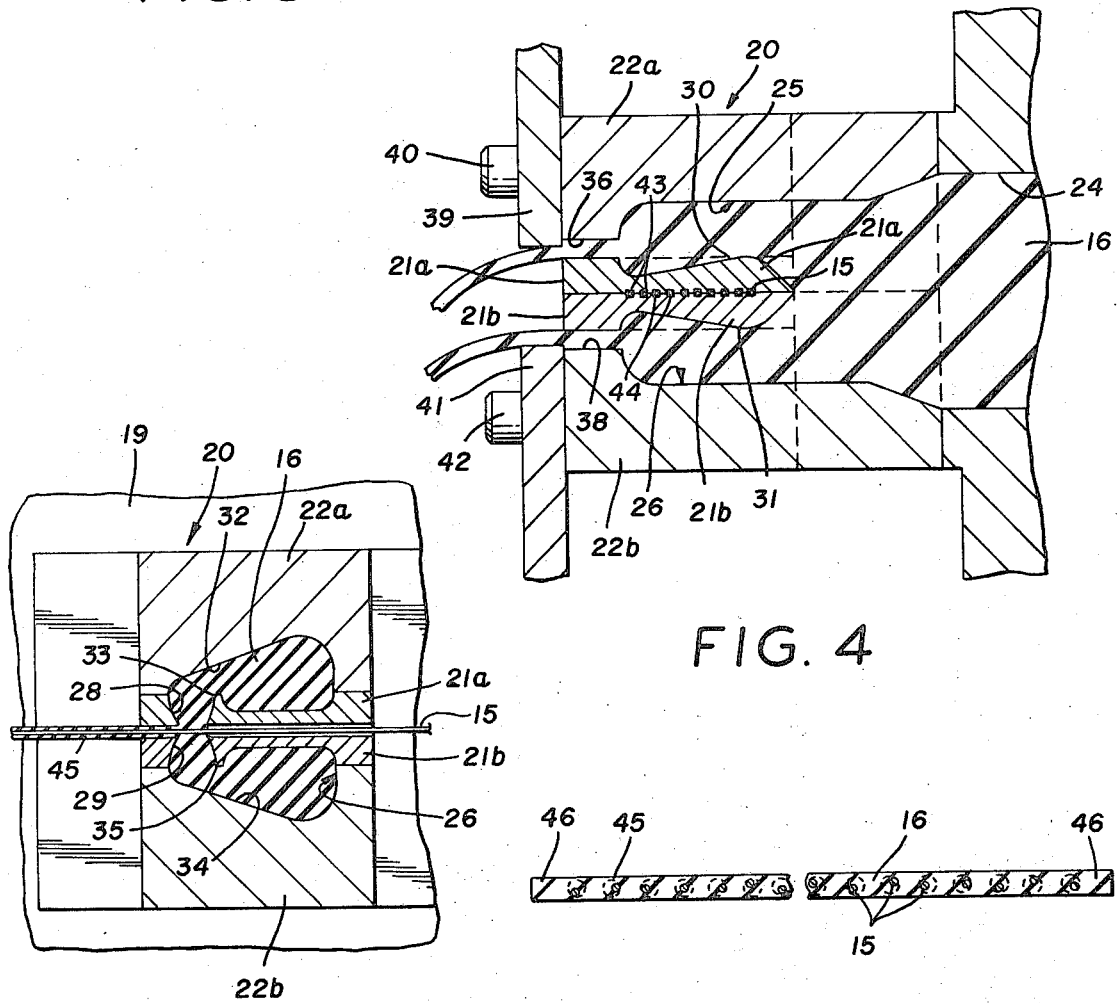
FIG. 4
FIG. 5
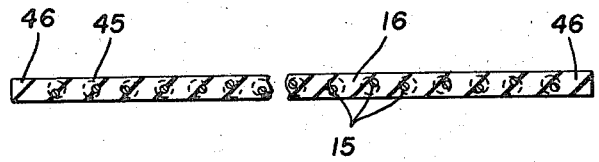
FIG. 9

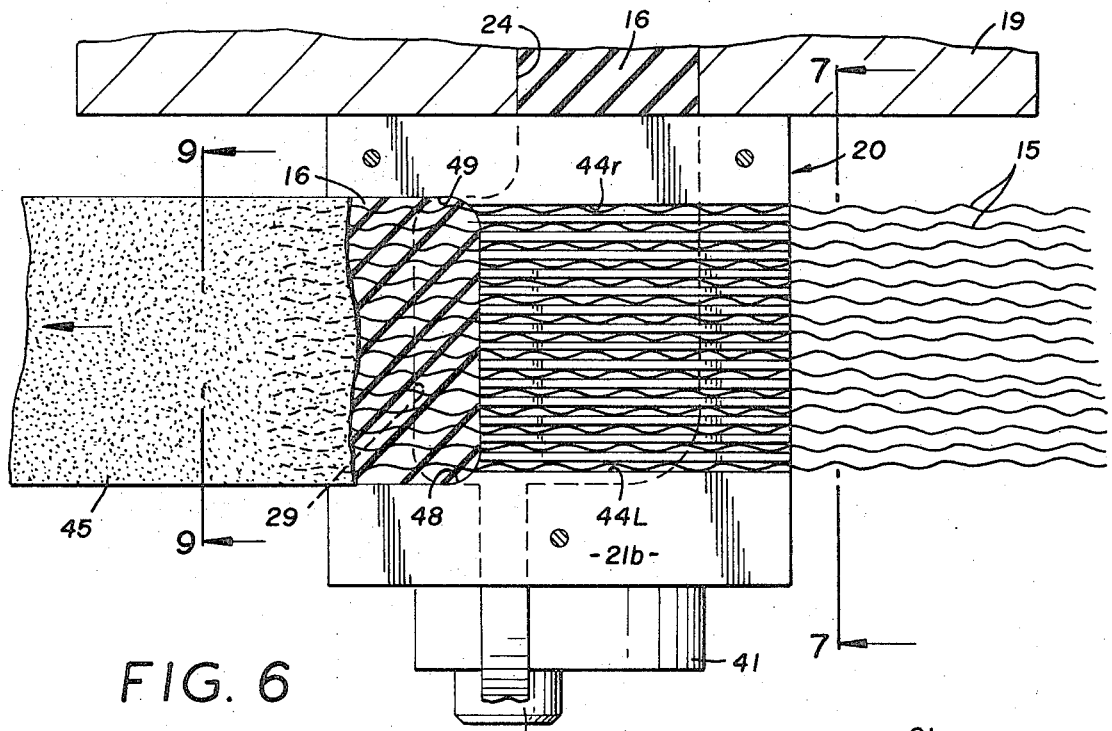
FIG. 6
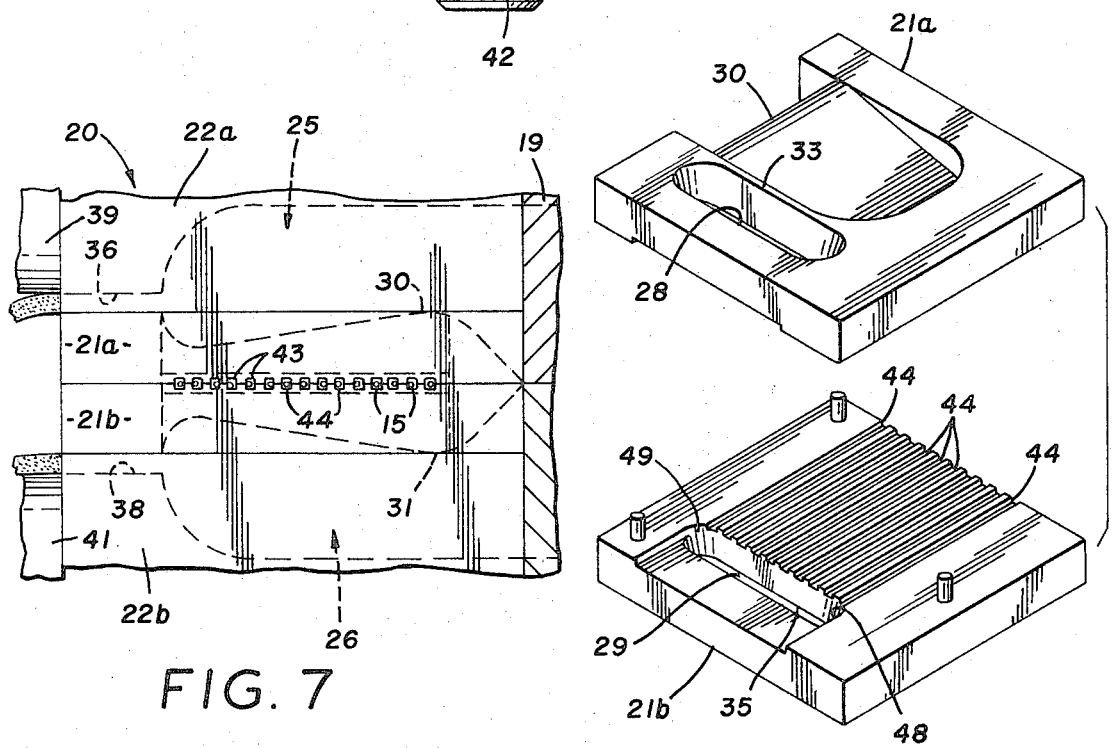
FIG. 7
FIG. 8

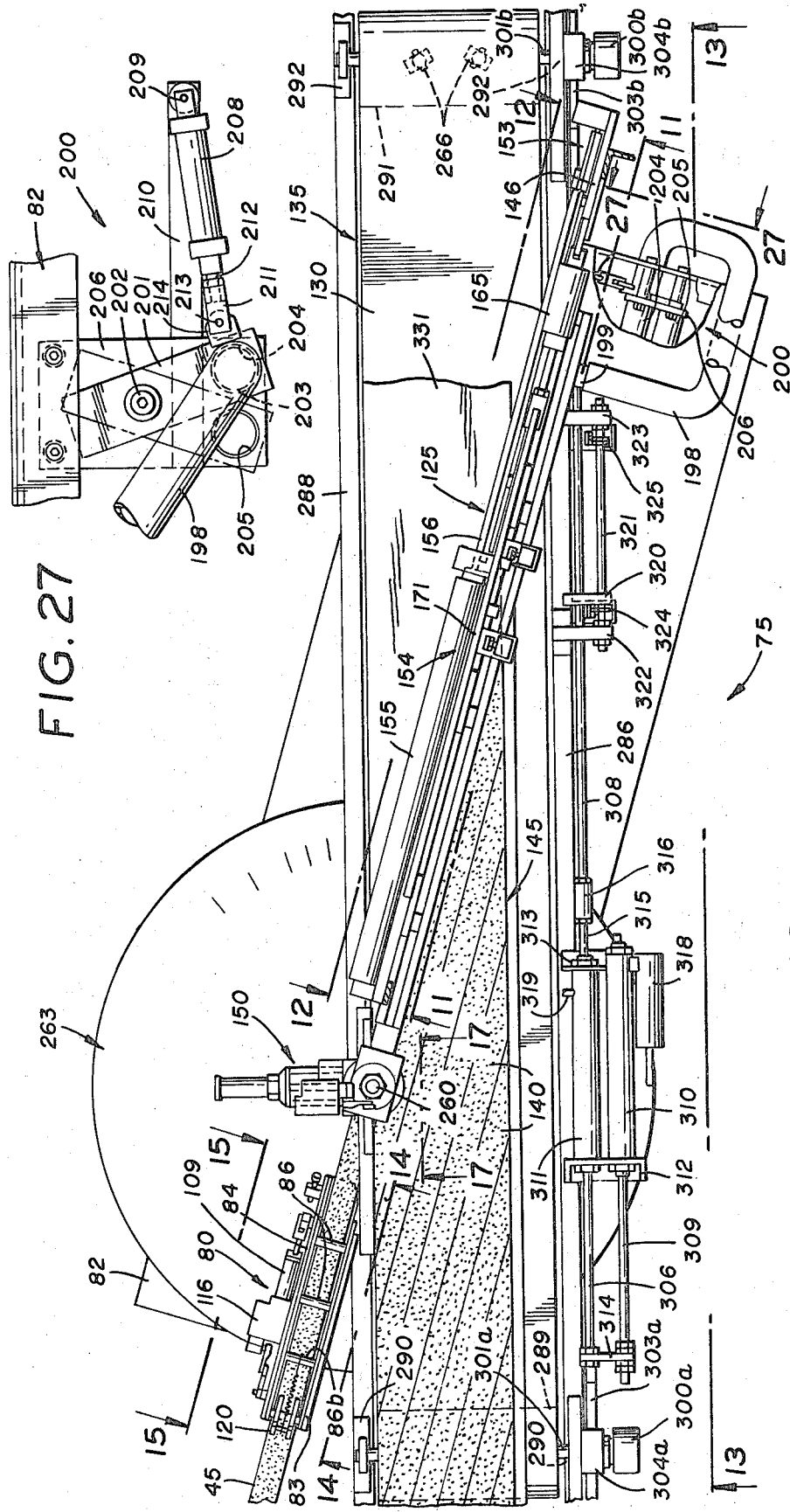

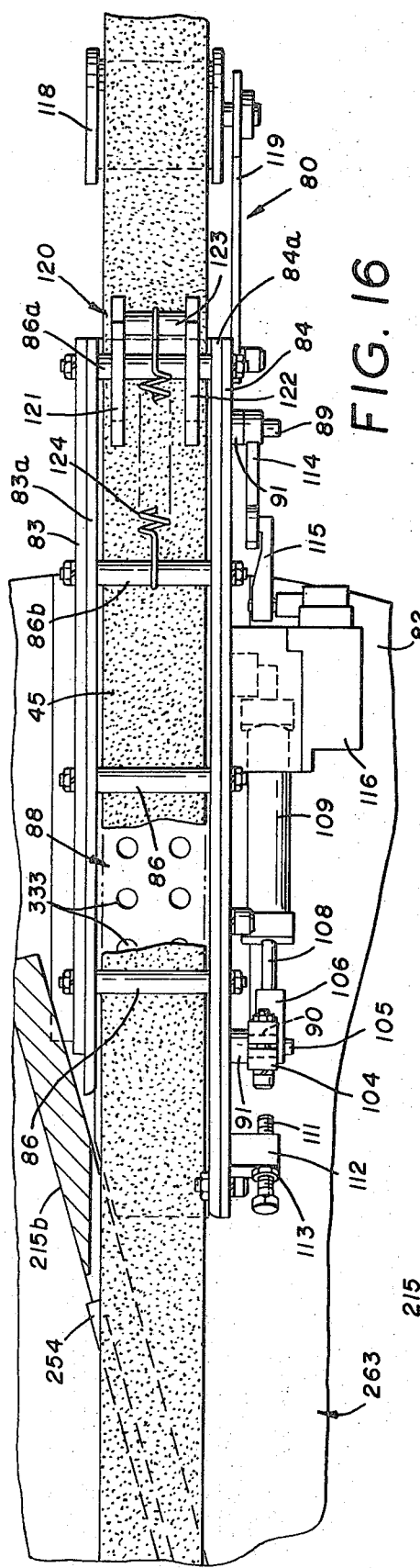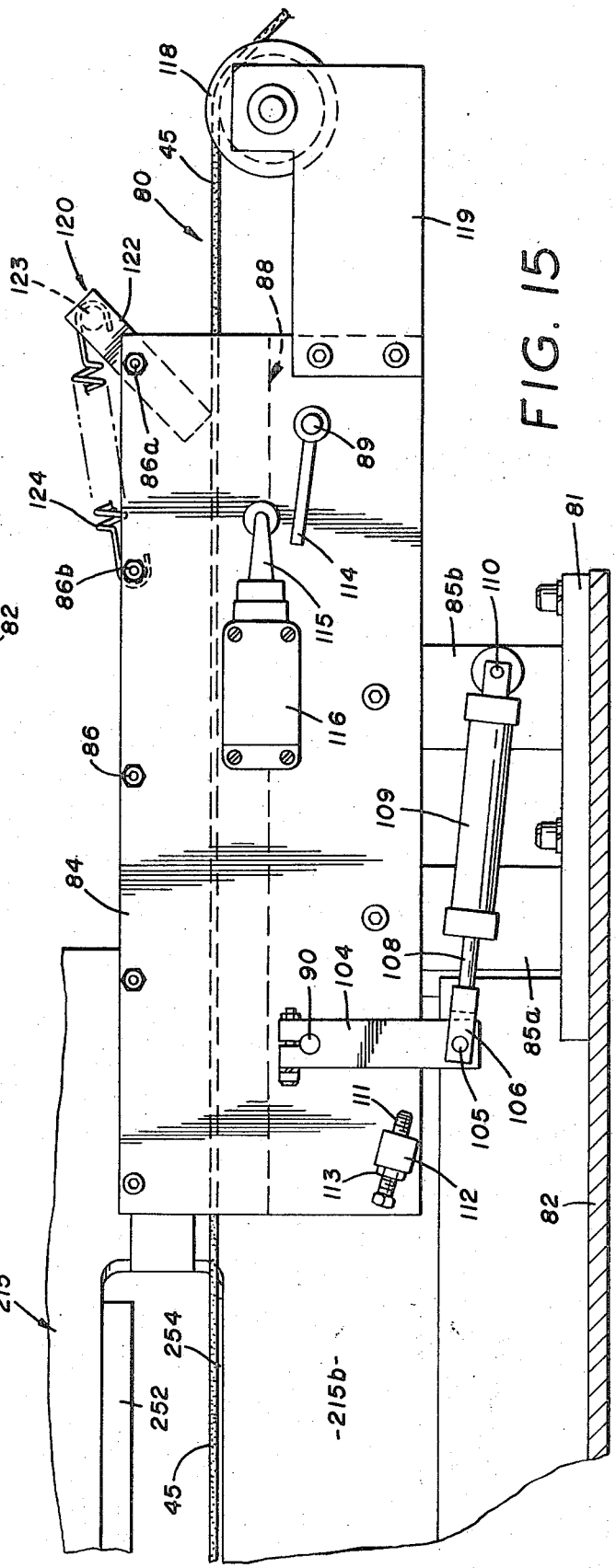

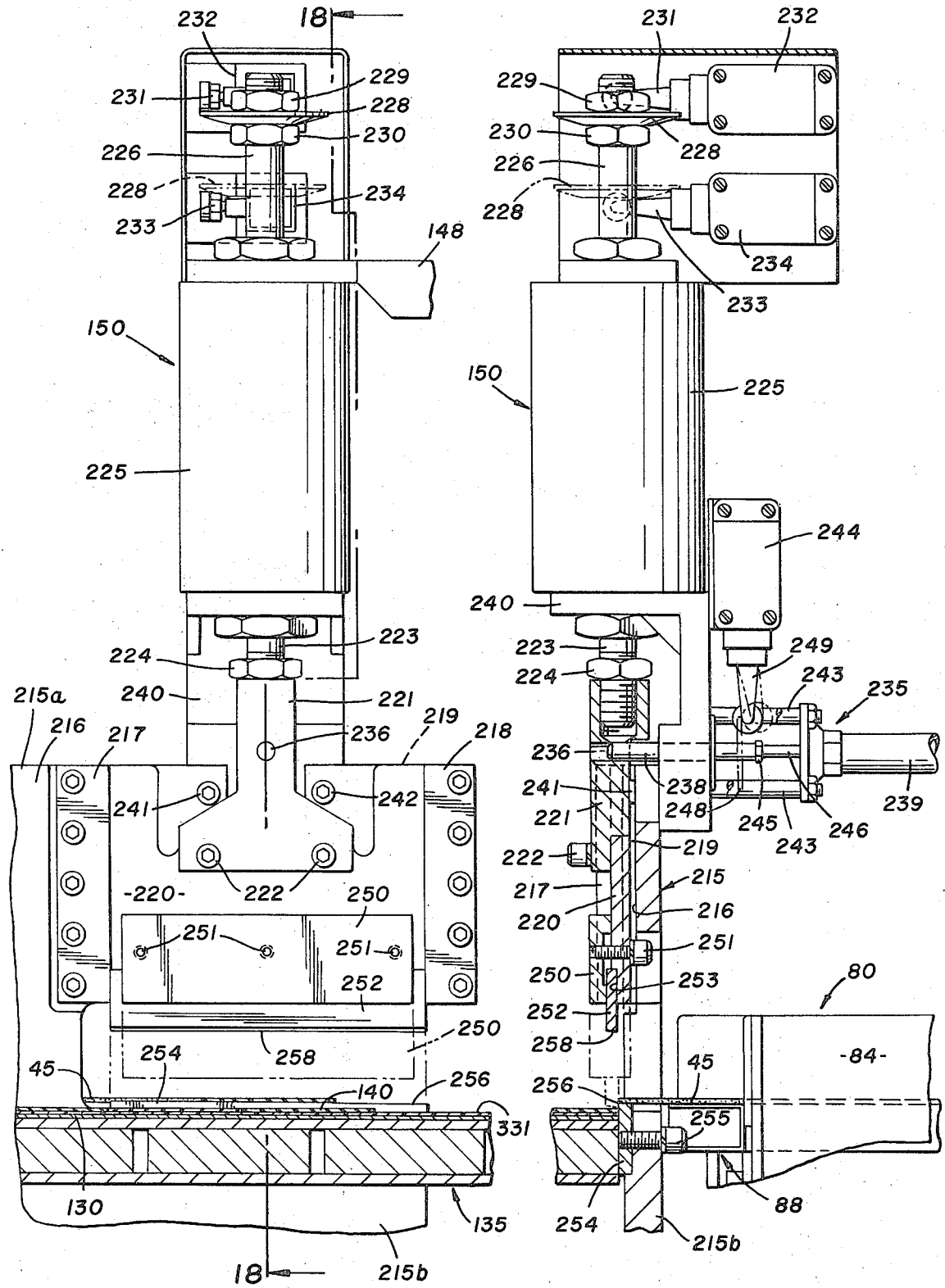

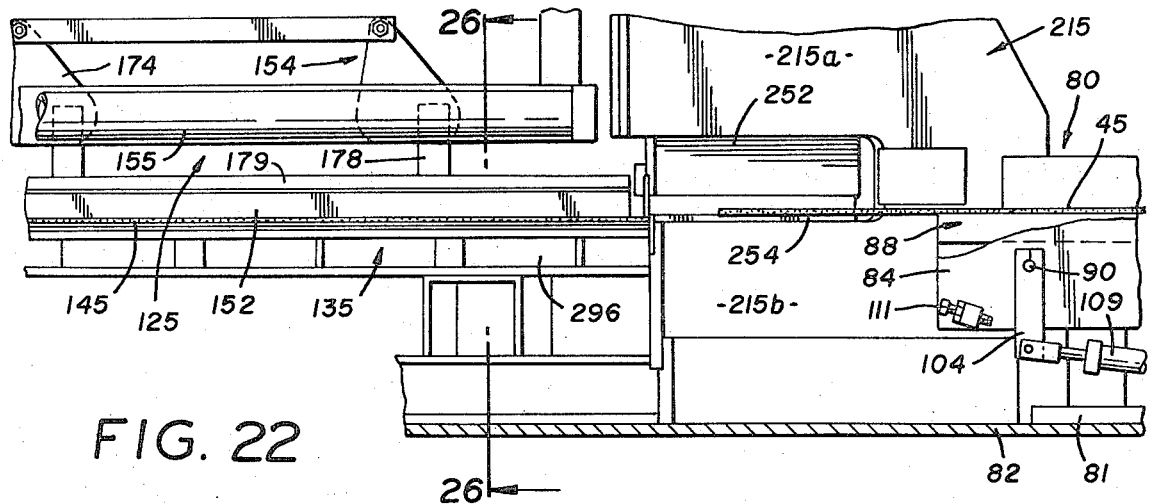
FIG. 22
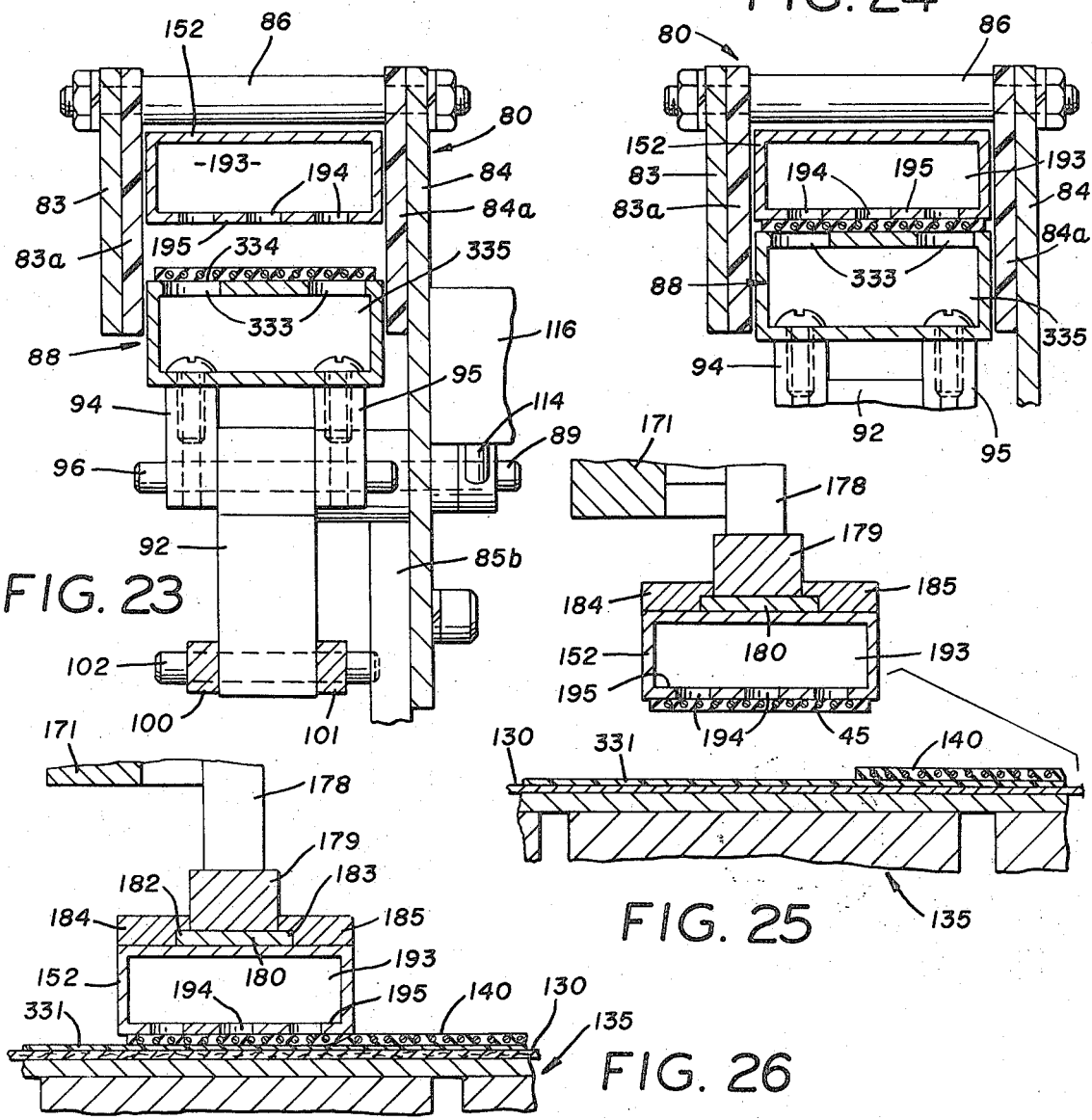
FIG. 24
FIG. 23
FIG. 25
FIG. 26

APPARATUS FOR PRODUCING REINFORCED FABRIC

BACKGROUND OF THE INVENTION

Prior to the early 1940's the reinforcing cord material used in pneumatic tire fabric was primarily cotton. During the early '40's rayon became the first snthetic fiber to be used as a reinforcing cord only to be subsequently challenged (1950 - 1960) by nylon which has a higher strength-to-weight ratio. Polyester, though also discovered in the 1940's, did not enter the tire cord market until the early '60's, and major attempts are presently being made to establish it as a tire reinforcing material.

The most recent entrant in the tire fabric reinforcing field has been glass fiber, and it does afford many of the physical properties which are not provided by the aforementioned reinforcing materials but which are uniformly agreed to be the most desirable characteristics for a reinforcing material to be used with mechanical rubber products such as tires — to wit: high tensile strength, low elongation, dimensional stability, high temperature resistance and absence of thermal shrinkage. Although glass fibers would thus appear to be the dream reinforcement for tire fabric, a number of negative characteristics have impeded its full acceptance.

Some of the major drawbacks in using glass fiber as a reinforcing material have been overcome only recently, but others remain. Abrasion resistance, and thus flex life, as well as an increase in rubber-to-glass fiber adhesion have been greatly improved in recent years to overcome two of the major drawbacks, but the fact that glass fibers have extremely low resistance to compressive stresses and the fact that the yield point of glass is uncomfortably close to its ultimate strength still stand as detractants to the acceptance of glass fibers as the ultimate reinforcing material.

The only material that possesses all the above-noted physical properties comprising the basic requirements for rubber reinforcing material and is neither beleaguered by compressive stresses nor has a yield point uncomfortably close to its ultimate strength is steel wire. Moreover, steel wire has been used in conjunction with rubber in tires since the late 1800's as a bead reinforcing material so that wire-to-rubber bonding techniques are exceptionally well developed. However, it has long been deemed necessary to weave, or cable, multiple wire filaments into strands, or cords, in order to achieve even minimally acceptable flexibility of the fabric reinforced thereby without fatiguing the wire through constant bending. The cabling of the wire into a reinforcing cord has also been deemed necessary to permit the controlled degree of elastic elongation desirable to avoid straining the wire beyond its elastic limit as the tire in which it is incorporated engages irregularities in the roadway over which it travels.

However, the cabling of wire to make a reinforcing cord for tire fabric adds an inordinate cost to the use of steel wire reinforcing in tire fabric and has, at least to some degree, diminished the measure of flexibility associated with comfortable ride characteristics. In an effort to alleviate this expense and soften the ride at least one attempt has been made to employ a single wire strand within a circumferential breaker belt interposed between the carcass and the tread. That wire was oriented substantially circumferentially of the tire and was crimped to provide sinuous undulations along the length thereof so as to be capable of at least partially straightening out to effect an increase in the circumferential dimension of the belt during shaping and curing of the tire, and, if desired, a further modicum of elasticity to the cured tire without cabling.

However, if the wire is completely straightened, the elastic limit may be too easily exceeded, and if the wire is not completely straightened, repeatedly extending the circumferential dimension of the wire by flexure of the undulations results in repeated bending stresses that tend to fatigue the wire and induce premature failure.

In the aforesaid attempt to utilize noncabled wire a continuous, single filament of the crimped wire was wound circumferentially about the tire carcass before the application of tread stock and in such a manner that: the undulations of each convolution were parallel to those of adjacent convolutions; the adjacent convolutions were in contact with one another; and, the undulations, at any given point along any given convolution, lay in a plane oriented tangentially to the convolution. By thus winding a continuous filament through a plurality of convolutions about the tire caracass the general lay of the wire is disposed substantially parallel — but at no more than a small angle — to a radial reference plane perpendicular to the rotational axis of the tire. This attempt to employ an uncabled, single filament of wire was unsuccessful.

Prior to the discovery that a single wire filament could be successfully employed, if of helical configuration as taught in my now allowed copending application for United States Letters Patent, Ser. No. 858, filed Jan. 6, 1970, when wire had theretofore been used as a reinforcement for tire fabric, the wire was almost universally first cabled and then a plurality of the cabled strands were embedded within rubber stock, as by calendering, to form the fabric.

Calendering has been the historic way in which to make tire fabric but calendering requires expensive equipment and highly skilled operators to make the sheets of fabric, particularly in widths sufficient to provide a biased orientation of the cabled wire within the finished tire.

When fabric is calendered the reinforcing cords are oriented parallel to the length of the fabric emanating from the calender. As such, in order for the reinforcing cords to be angularly inclined with respect to a circumferential reference plane when the fabric is incorporated in a tire, it is necessary to cut the fabric on the bias. Bias cutting, particularly when the angle desired demands a long cut, is a difficult process requiring expensive machinery and entails considerable waste.

In view of the cost of wire reinforcing such waste is intolerably expensive and attempts have therefore been engendered to devise an apparatus for severing elemental strips from a continuous ribbon of wire reinforced material and assembling those elemental strips in adjacent juxtaposition so as to form a belt, or sheet, in which the reinforcing material is disposed at the desired bias.

Such attempts have largely centered upon feeding the ribbon past a cutting mechanism and onto an assembly table at a predetermined angle with respect to the cutting mechanism; severing a strip of predetermined length from the ribbon; and, manipulating the strip so as to stitch it to the preceding strip on the assembly table. Such a rudimentary device was disclosed in my aforesaid application, Ser. No. 858, but unfortunately such an approach has not proven itself to be successful.

Only after considerable experimentation was it discovered that the ribbon cannot be satisfactorily fed past the cutting mechanism and onto the assembly table. In prior known devices the flexible nature of the ribbon has required considerable manipulation of the strip subsequent to the time it was severed from the ribbon in order to effect even a modicum of satisfactory stitching to the precedingly deposited strip. As such, apparatus embodying the "feeding" approach have become unduly complicated and the results too unpredictable for commercial acceptance.

SUMMARY OF THE INVENTION

It is, therefore, a primary object of the present invention to provide a method and apparatus for producing wire reinforced fabric which eliminates the necessity of calendering in wide widths or, in fact, calendering itself.

It is another object of the present invention to provide a method and apparatus, as above, by which a ribbon of reinforced material is preliminarily oriented and then positively engaged and transferred to an assembly table for precisely accurate deposit thereon so as to effect stitching to the precedingly deposited strip from such ribbon without further manipulation.

It is yet another object of the present invention to provide a method and apparatus for producing wire reinforced fabric, as above, in a form that can be incorporated in a tire as a ply in which the bias of the reinforcing wires therein can be preselected without waste.

It is a further object of the present invention to provide a method and apparatus, as above, which can be readily adapted to produce fabric from ribbons reinforced with a wide variety of materials, metallic and non-metallic, and in continuous lengths.

It is an even further object of the present invention to provide a method and apparatus for producing a ribbon of reinforced material from which elemental strips are particularly adapted for assembly as a fabric.

These and other objects, together with the advantages thereof over existing and prior art forms, which will become apparent from the following specification are accomplished by means hereinafter described and claimed.

In general, an apparatus embodying the concept of the present invention, and operable according to the method thereof, for making reinforced fabric draws a plurality of reinforcing filaments through the unique die plate of a cross head extruder in which the reinforcing filaments are encapsulated by an uncured, elastomeric compound. The continuous ribbon of reinforced, but uncured, elastomeric compound emanating from the extruder may be cooled and passed through a festooner before being received on the table of a lead-in mechanism.

Guide means preliminarily orient the ribbon on the lead-in table from which the ribbon is positively engaged by a transfer means that meters a strip of predetermined length to a position above an assembly table and then accurately deposits the full metered length onto the assembly table with such precision as to effect the desired stitching arrangement with the precedingly deposited strip. A guillotine means severs the strip of predetermined length from the ribbon, and the assembly table indexes to receive a successive strip.

At least one edge of each strip is preferably provided with a selvage of elastomeric compound in which no reinforcing is encapsulated in order to facilitate the stitching of successive strips.

Although it has been found highly desirable to extrude the ribbon of elastomeric compound with the reinforcing material encapsulated therein, it should be appreciated that the reinforcing material may well be calendered between opposed ribbons of elastomeric material with facility and the resulting "sandwich" fed onto the table of the lead-in mechanism of the subject apparatus.

A preferred embodiment of apparatus suitable for practicing the method of the present invention to make fabric from elemental strips of reinforced, but uncured, elastomeric compound is shown by way of example in the accompanying drawings and described in detail, along with a preferred extruding means by which to encapsulate the reinforcing material within the elastomeric compound, without attempting to show all of the various forms and modifications in which the invention might be embodied; the invention being measured by the appended claims and not by the details of the specification.

DESCRIPTION OF THE DRAWINGS

FIG. 1 is a schematic side elevation representing a plurality of reinforcing filaments entering an extruder head and emerging as an elastomeric ribbon in which the reinforcing filaments are encapsulated, the ribbon thereafter being represented as passing over and around cooling drums and, sequentially, a festooner;

FIG. 2 is a horizontal section taken substantially on line 2—2 of FIG. 1 and representing the drive mechanism of the cooling drums in top plan;

FIG. 3 is an enlarged top plan of the extruder head taken substantially on line 3—3 of FIG. 1;

FIG. 4 is a further enlarged vertical section taken substantially on line 4—4 of FIG. 3 and representing the cross section of the extruder head transversely to the direction in which the reinforcing filaments pass therethrough;

FIG. 5 is a vertical section on a scale comparable to that of FIG. 4 but taken transversely thereto substantially on line 5—5 of FIG. 3;

FIG. 6 is an even further enlarged horizontal section taken substantially on line 6—6 of FIG. 1 to depict the reinforcing filaments passing through the comb guides in the die plate and the eventual encapsulation of the filaments within the elastomeric material being extruded;

FIG. 7 is an end elevation of that side of the extruder head into which the reinforcing filaments enter and is taken substantially on line 7—7 of FIG. 6;

FIG. 8 is an exploded perspective of the die plates used in the extruder head detailed in FIGS. 3 – 7;

FIG. 9 is a vertical section through the reinforced ribbon of elastomeric material being emitted from the extruder head, said section being taken substantially on line 9—9 of FIG. 6 and appearing on the same sheet of drawings as FIGS. 3 – 5;

FIG. 10 is a schematic top plan view of a preferred form of apparatus for receiving a reinforced ribbon of elastomeric material and assembling a plurality of strips cut from such a ribbon into a ply strip having a predetermined bias of the reinforcing filaments therein;

FIG. 15 is a view similar to FIG. 14 but taken substantially on line 15—15 of FIG. 10 and depicting the opposite side of said lead-in mechanism;

FIG. 16 is a top plan view of the lead-in mechanism depicted in FIGS. 14 and 15;

FIG. 17 is an enlarged, frontal elevation of the guillotine means for severing strips of material from the supply ribbon, said elevation taken substantially on line 17—17 of FIG. 10;

FIG. 18 is a vertical section, partly in elevation, taken substantially on line 18—18 of FIG. 17;

FIG. 22 is a view similar to FIG. 21 depicting an operational sequence subsequent to that represented in FIG. 21 — i.e., the shuttle head having been lowered, positively to deposit the portion of ribbon extracted from the lead-in table at a precisely predetermined location on the assembly table;

FIG. 23 is an enlarged, transverse, vertical section through said lead-in table, and a portion of its operating mechanism, and taken substantially on line 23—23 of FIG. 19;

FIG. 24 is an enlarged, transverse, vertical section similar to a portion of FIG. 23 but taken substantially on line 24—24 of FIG. 20;

FIG. 25 is an enlarged, transverse, vertical section through the shuttle head and the assembly table and taken substantially on line 25—25 of FIG. 21;

FIG. 26 is an enlarged, transverse, vertical section similar to FIG. 25 but taken substantially on line 26—26 of FIG. 22;

FIG. 27 is an enlarged frontal elevation of the vacuum control swing valve taken substantially on line 27—27 of FIG. 10 and appearing on the same sheet of drawings as FIG. 10;

DESCRIPTION OF THE PREFERRED EMBODIMENT

Figure 11:
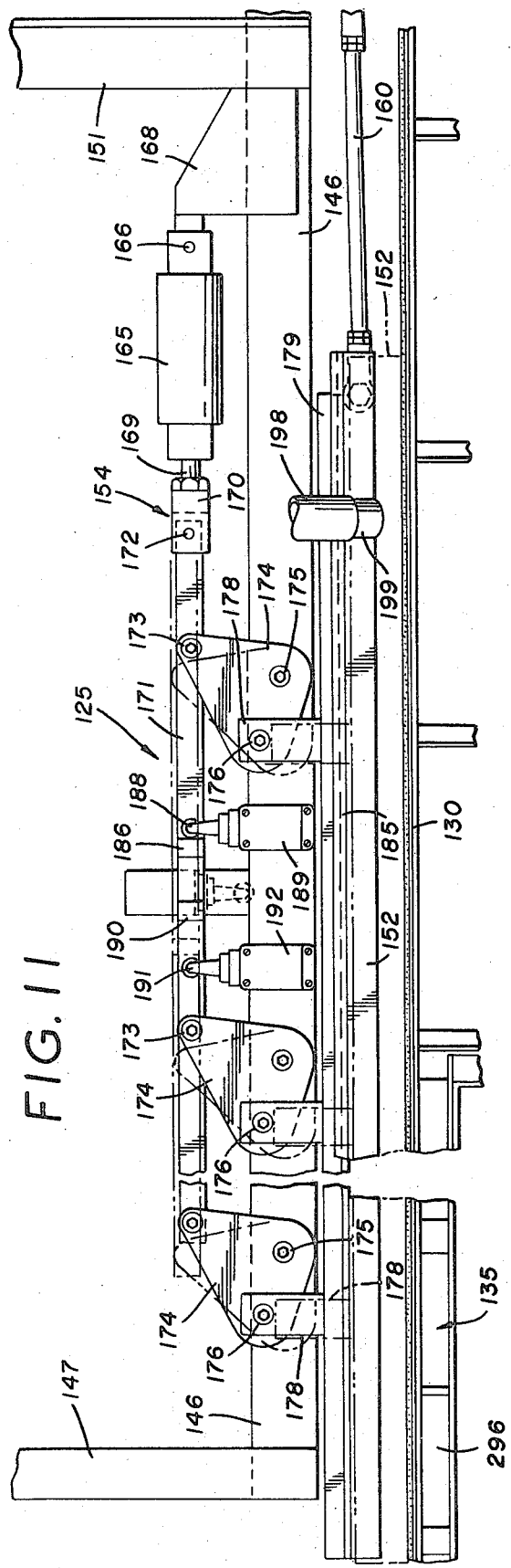
FIG. 11 is an enlarged partial side elevation taken substantially on line 11—11 of FIG. 10 and primarily intended to depict the shuttle head and the mechanism by which said shuttle head is raised and lowered.

Referring more particularly to the drawings, and specifically FIGS. 1 and 10, an apparatus for encapsulating reinforcing filaments within a ribbon of elastomeric material and then severing elemental strips from said ribbon and laterally joining a succession of such strips into a belt in which the reinforcing filaments are disposed at a predetermined bias is depicted schematically by a composite of FIGS. 1 and 10. Specifically, in FIG. 1 a plurality of reinforcing filaments 15 are represented as entering the cross head die 20 of an extruder 19 and exiting as a ribbon 45 of reinforcing filaments encapsulated within an elastomeric material 16. The ribbon 45 thereupon passes through a cooling means 50 and over a festooner 70. In FIG. 10 the ribbon 45 is depicted as being converted to a belt 145 by a bias-cutting machine 75.

Although the present invention is well adapted to make a belt 145 reinforced with a variety of reinforcing filaments, it is particularly suited to the use of helical, wire filaments such as disclosed in my copending application for U.S. Letters Patent, Ser. No. 858, filed on Jan. 6, 1970. As such, the filaments 15 entering the extruder cross head die 20 may well have been helically delineated on the wire forming mechanism disclosed in my aforementioned U.S. patent application, Ser. No. 858, or on the improved embodiment of wire forming apparatus disclosed in a second of my copending applications for U.S. Letters Patent, Ser. No. 104,602, filed Jan. 7, 1971.

Irrespective of the particular reinforcing filaments employed, it is desirable that as much of the surface of each filament 15 as possible be in contact with the elastomeric material 16 forming the body of the ribbon 45. To accomplish this result a rather unique set of die plates 21a and 21b (FIG. 8) were developed. As shown in FIGS. 3 - 7, the die plates 21a and 21b are embracingly secured between a pair of opposed die blocks 22a and 22b that are, in turn, secured to the face 23 of the extruder 19. The throat 4 of the extruder communicates with a passageway 25 formed between the die plate 21a and the die block 22a as well as a passageway 26 formed between the die plate 21b and the die block 22b.

The passageways 25 and 26 are each restricted in proximity to the throat 24 of the extruder 19 and flare therebeyond in order to augment the flow of the extruded material 16 therethrough, to obviate undesirable eddying of the material 16 and to provide a relatively constant flow of extruded material 16 into and through the opposed die orifices 28 and 29 in the respective die plates 21a and 21b. The flaring restriction in each passageway 25 and 26 can well be achieved by presenting a ridge 30 on die plate 21a which extends transversely to passageway 25 and a corresponding ridge 31 on die plate 21b which extends transversely to passageway 26. For this configuration to be fully effective it is desirable not only that each passageway constrict toward the corresponding die orifice but also that each passageway be vented for overflow of the extruded material 16.

As best seen in FIG. 5, the passageway 25 constricts toward die orifice 28 by virtue of the sloping uppermost passage wall 32 in die block 22a and the opposed weir wall 33 in the die plate 21a bewteen which the extruded material 16 must pass to flow from the passageway 25 into and through the die orifice 28. Similarly, the lowermost passage wall 34 in the die block 22b slopes to constrict the passage 26 toward die orifice 29 and is likewise opposed by a weir wall 35 in die plate 21b between which the extruded material 16 must pass to flow from the passageway 26 into and through die orifice 29.

As best seen in FIGS. 1, 4 and 7, an aperture 36 is provided through die block 22a to vent the outer extremity of the passageway 25, and a similar aperture 38 is provided through die block 22b to vent the outermost extremity of passageway 26. Each aperture is also preferably gated to afford a selective volume of flow therethrough. As best seen in FIG. 1, an eccentric gate 39 is mounted on stub shaft 40 to control the exiting flow through aperture 36, and an eccentric gate 41 is mounted on stub shaft 42 to control the exiting flow through aperture 38.

In order to enhance the amount of surface area on each reinforcing filament, or bundle thereof, that is exposed to the extruded material 16 as it comes in contact therewith and also to obtain a degree of uniformity in the spacing between adjacent filaments, the die plates 21a and 21b preferably incorporate a comb means. That is, a plurality of laterally spaced, parallel slots 43 in die plate 21a opposingly register with similar slots 44 in the die plate 21b to maintain the reinforcing filaments 15 in predetermined spaced relation through the cross head die 20 and into the ribbon 45.

For some ultimate uses of belts 145 fabricated on apparatus embodying the concept of the present invention it may be desirable, or even necessary, that the successive strips of ribbon be butt spliced. However, for many ultimate uses it may be perfectly acceptable to employ an overlapping splice. By employing a judicious placement of the reinforcing filaments with respect to the edges of the ribbon 45 an overlapping splice can be effected without overlapping the reinforcing filaments and without varying the spacing between successive filaments, even across the splice. Thus, a selvage 46 (FIG. 9) of unreinforced elastomeric material 16 is preferably provided along each edge of the ribbon 45 when an overlapping splice is desired, and the dimension of this selvage may be predetermined by selecting the extent to which the die orifices extend laterally outwardly of the comb means. As can best be seen in FIG. 6, the die orifice 29 extends, as at 48, laterally outwardly with respect to the slot 44L bounding one edge of the comb means, and die orifice 29 similarly extends, as at 49, laterally outwardly with respect to the slot 44R bounding the opposite edge of the comb means. By affording corresponding lateral dimensioning to the registered die orifice 28, a full thickness selvage will be provided along each lateral edge of the ribbon. While such an arrangment is depicted herein it may be desirable for some operations to effect a scarf joint between the successive elemental ribbon strips, and this can readily be accomplished by varying the extent to which the die orifices extend laterally of the comb means with respect to each other.

As the ribbon 45 emerges from the cross head die 20 it preferably passes through the cooling means 50. In the representative cooling means depicted in FIG. 1 the ribbon may be reeved beneath a first idler drum 51, over a second idler drum 52 and under a driving drum 53. A cinch roll 54 may be rotatably mounted on a swing arm 55 and biased, as by spring 56, against the driving drum 53 to assure a driving, frictional engagement of the ribbon 45 with the drum 53.

A cooling medium is preferably circulated through each drum, and as can best be seen in FIG. 2, concentric input and exhaust conduits 58 and 59 communicate with the nave portion 60 of each drum. Conduits 58 and 59 which circulate the cooling medium through the idler drums 51 and 52 do so through the respective spindle means 61 and 62 on which said idler drums are rotatably mounted, and the conduits 58 and 59 which circulate the cooling medium through the driving drum 53, do so through the drive shaft 63 by which the drum 53 is rotated.

As best shown in FIG. 2, the drive shaft 63 may be rotated from a prime mover (not shown) which is operatively connected to a sprocket wheel 64 by a drive chain 65. To obtain a suitable angular velocity for the driving drum 53, the sprocket wheel 64 may be secured to an idler shaft 66 in proximity to the drive shaft 63 and the two shafts may be operatively interconnected by a reducing gear train 68.

As the ribbon 45 leaves the cooling means 50 on its journey toward the bias-cutting machine 75, it is highly desirable that it pass through a festooner, represented schematically at 70, in order to accommodate the continuous supply of ribbon 45 to the cyclically intermittent consumption of the ribbon 45 by operation of the bias-cutting apparatus 75.

Although there have been many attempts to construct a satisfactory bias-cutting apparatus, the attempts have not heretofore resulted in a commercially successful embodiment because the difference between success and failure has been found to reside in the subtle sophistication embodied in the subject apparatus 75.

Figure 14:
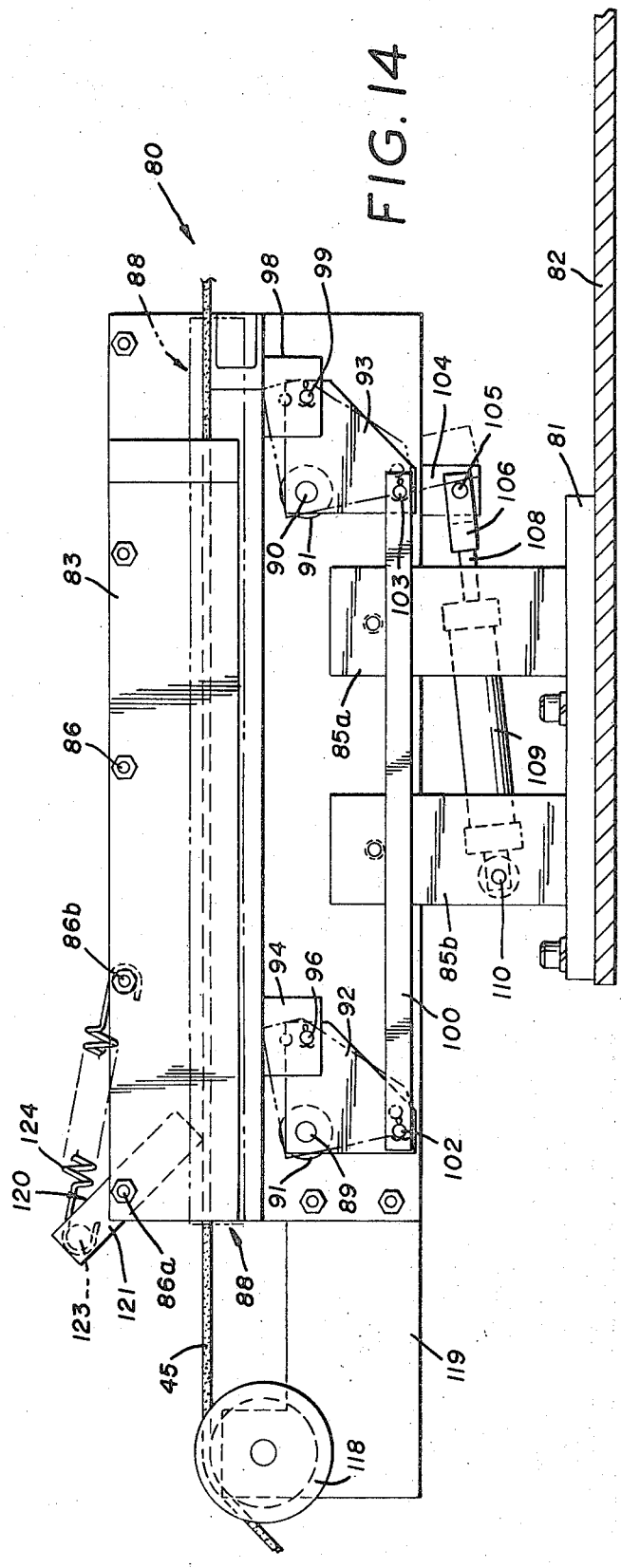
FIG. 14 is an enlarged side elevation taken substantially on line 14—14 of FIG. 10 and intended to depict the lead-in table and the mechanism by which said lead-in table is selectively raised and lowered.

In order to obtain a general orientation of the various interacting components which are incorporated within the apparatus 75, frequent reference will be made to FIG. 10. For example, to begin the description of the apparatus 75 it is helpful to refer to FIG. 10 wherein it can be observed that the ribbon 45 enters, and is received, upon a lead-in mechanism designated generally by the numeral 80. As best seen in FIGS. 14, 15 and 16, the bed plate 81 of the lead-in mechanism 80 is supported on the quadrant plate, hereinafter designated with the numeral 263, which constitutes one component of the frame, indicated generally by the numeral 82, of the apparatus 75. The lateral side plates 83 and 84 and fill plates 83a and 84a (FIG. 23) that form the guideway by which preliminary alignment of the ribbon 45 is assured are carried on a pair of posts 85a and 85b that extend upwardly from the bed plate 81. The lateral spaced relation of the side plates 83 and 84 is maintained by a plurality of spacing pillars 86 secured therebetween.

A table 88, adapted to be raised and lowered, is disposed between the side plates. The vertical movement of the table, as well as its support, is effected by a pair of rockshafts 89 and 90 that extend transversely between the side plates and are journaled in bearings 91 secured within the side plates. At least one rocker arm 92 is secured to rockshaft 89, and, similarly, at least one rocker arm 93 is secured to rockshaft 90.

A pair of laterally spaced tabs 94 and 95 (FIG. 23) are secured to the table 88 to constitute a bracket means that embraces the rocker arm 92 and is pivotally connected thereto, as by pin 96. A similar bracket means 98 pivotally connects the table 88 to the rocker arm 93 by pin 99.

A linking means, such as the parallel bars 101, is connected between the rocker arms 92 and 93 to effect movement of one in unison with movement of the other. As such, pivot pins 102 and 103 connect the bars 100 and 101 to the rocker arms 92 and 93, respectively.

As best seen in FIG. 15, one end of the lever arm 104 is nonrotatably secured to rockshaft 90, and the other end is pin-connected, as at 105, to a clevis 106 presented on the end of a piston shaft 108 that is reciprocated by control cylinder 109. The cylinder 109 is itself mounted to swing on a pin 110 that extends outwardly of the support post 85b. For the operational purposes hereinafter more fully explained, the actuation of cylinder 109 selectively raises and lowers the table 88, and the precise location of the table at its vertically uppermost position is controled by a set screw 111 presented from a lug 112 secured to the side plate 84. Engagement of the lever 104 against the set screw 111 limits the throw of the lever arm 104 and thereby predetermines the uppermost position of the table 88. A lock nut 113 may be employed to maintain the position of the set screw 111.

An engaging arm 114 is nonrotatably secured to the rockshaft 89 and is oriented to trip the throw arm 115 on switch 116 when the table 88 reaches its uppermost position. The purpose for switch 116 will be hereinafter more fully explained in conjunction with the operation of the apparatus 75.

The lead-in mechanism 80 also preferably employs a flanged guide roll 118 aligned with the table 88 and spaced longitudinally therefrom to facilitate the critical orientation of the ribbon 45 thereon. As best seen in FIGS. 15 and 16, the guide roll 118 may be rotatably mounted on an extension plate 119 that is secured to the side plate 84.

Finally, the lead-in mechanism 80 employs a brake 120 by which to prevent retraction of the ribbon 45 received on table 88. The rake 120 constitutes a pair of spurs 121 and 122 rotatably mounted on spacing pillar 86a. A cross bar 123 is secured between the spurs 121 and 122 radially outwardly of the pillar 86a and is engaged by one end of a tension spring 124. The opposite end of the spring 124 is anchored to a second spacing pillar 86b so as to bias the spurs 121 and 122 into engagement with the ribbon 45 received on table 88 and thereby prevent it from being inadvertently retracted.

A transfer means 125 engages at least a portion of the ribbon 45 that has been precisely oriented on the lead-in mechanism 80, withdraws a predetermined length of said ribbon and positively deposits the withdrawn portion of said ribbon at a precisely selected location on the conveyor belt 130 that constitutes the upwardly directed surface of the table 135 on which the elemental strips 140 of ribbon 45 are assembled into a belt 145 of reinforced fabric.

Figure 19:
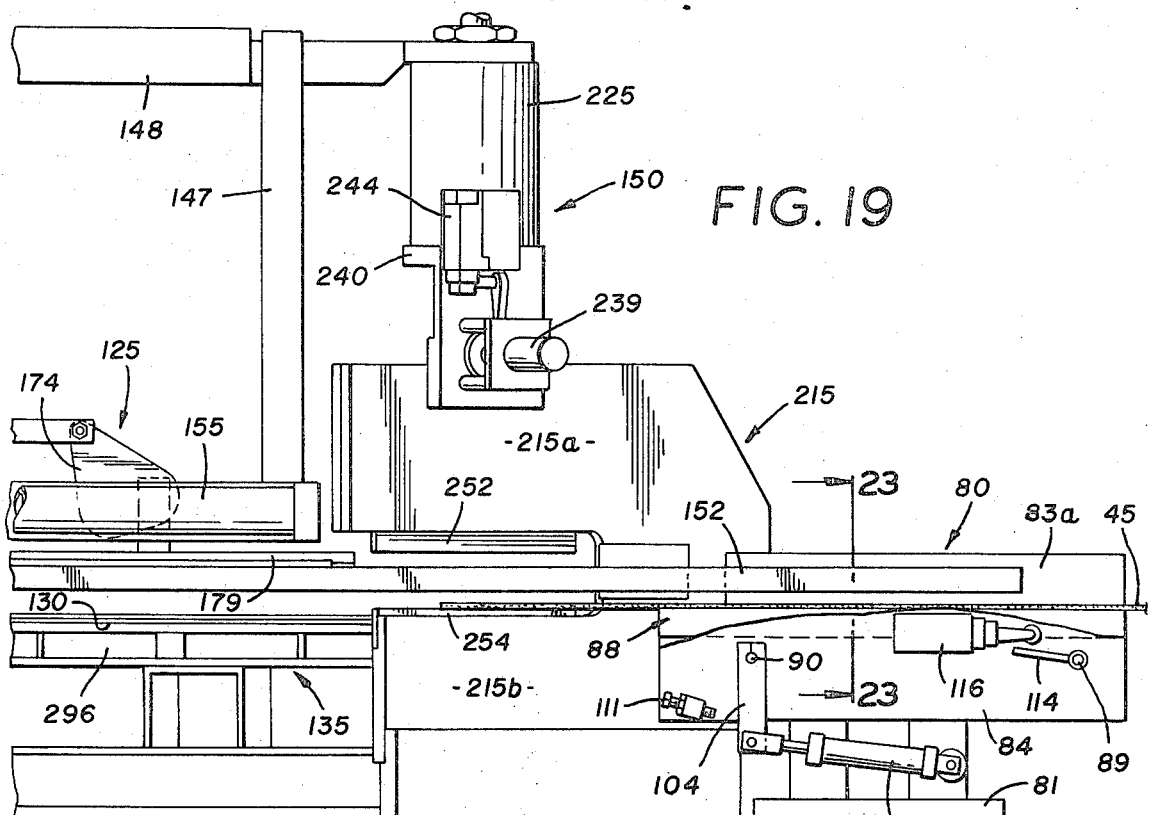
FIG. 19 is an elevation depicting the lead-in table, the guillotine and a portion of the shuttle head after said shuttle head has been translated longitudinally of itself to a position above said lead-in table.

As best seen in FIGS. 10, 11, 12 and 26, the transfer means 125 is carried by a support beam 146 that spans the table 135. The end of beam 146 most remote from the lead-in mechanism 80 is supported (though not shown) by the frame of the apparatus 75, and the end of the beam 146 in closest proximity to the lead-in mechanism 80 is supported by a tie rod 147 that depends from a gantry 148 (FIG. 19). That end of the gantry 148 in closest proximity to the lead-in mechanism 80 is supported from the operating mechanism of guillotine means 150, as is also best seen in FIG. 19, and the opposite end of the gantry 148 is supported by a column 151 that extends upwardly from beam 146 (FIG. 11).

The transfer means 125 incorporates a shuttle head 152 that is movable horizontally of itself by virtue of a first actuating means 153 and, selectively, is movable vertically by virtue of a second actuating means 154.

Figure 12:
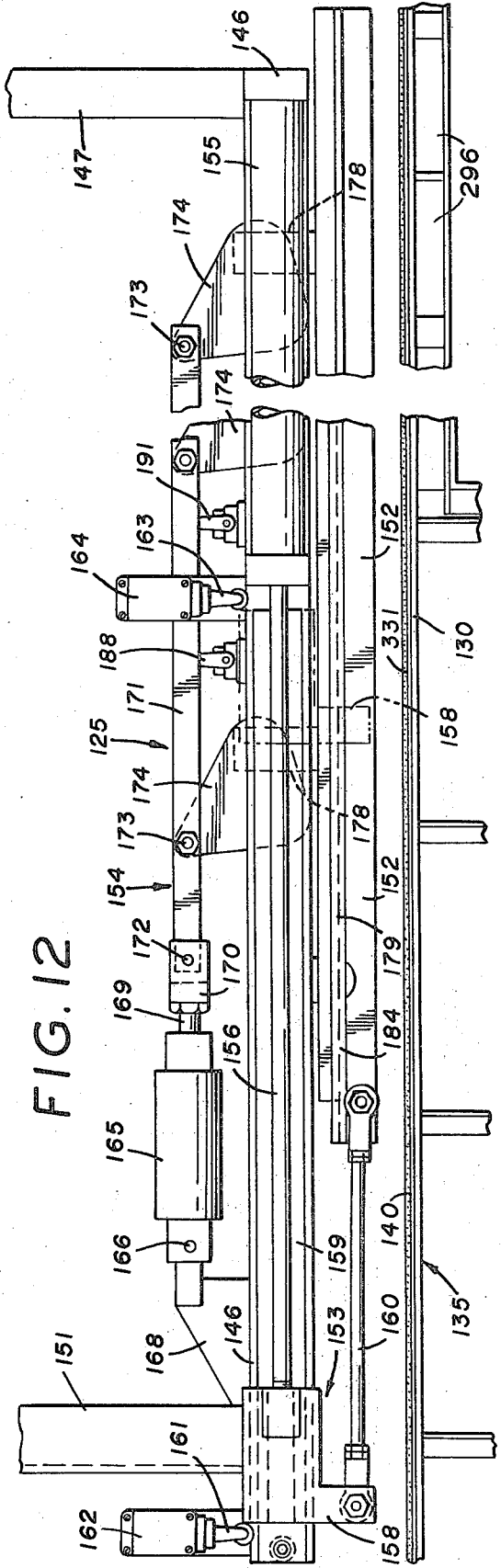
FIG. 12 is a view similar to FIG. 11 but taken substantially on line 12—12 of FIG. 10 and depicting the opposite side of the shuttle head in elevation and being intended to depict the mechanism by which said shuttle head is translated longitudinally of itself as well as the mechanism by which it is raised and lowered.

As best seen in FIG. 12, a preferred embodiment of the first actuating means 153 constitutes a double-acting control cylinder 155 secured to the support beam 146. The cylinder 155 selectively extends and retracts a piston rod 156, the outer end of which is secured to a trolley 158 that is slidably mounted on a track way 159 fastened to the side of the support beam 146. The trolley 158 is, in turn, operatively connected to the shuttle head 152 by a pitman 160. When the piston rod 156 has been extended to its desired outermost position, the trolley 158 trips the throw arm 161 of a switch 162 fastened to the main support beam 146, and when the piston rod 156 has been retracted to its desired innermost position, the trolley 158 (in chain line representation) trips the throw arm 163 on switch 164.

As best seen in FIG. 11, the preferred embodiment of the second actuating means 154 employs its own double-acting cylinder 165. A pin 166 anchors the cylinder 165 to a mounting bracket 168 that is also secured to the main support beam 146. The piston rod 169 controlled by cylinder 165 terminates in a clevis 170 that is connected to push rod 171 by pin 172. The push rod 171 is operatively connected, as by pin connections 173 to swing a plurality of bell cranks 174 journaled from their respective stub shafts 175 extending outwardly from the main support beam 146. The bell cranks 174 are also each operatively connected, as by pin connections 176, to connector tabs 178 that are secured to, and extend upwardly from, a slide bar 179. As best seen in FIG. 26, a plate 180 is secured to the lower surface 181 of slide bar 179 and extends laterally therebeyond to present flanged tracks 182 and 183 along the length of the slide bar 179. A pair of angle gibs 184 and 185 are connected to the shuttle head 152 and engage the tracks 182 and 183, respectively, to permit the shuttle head 152 to slide longitudinally of itself along the slide bar 179.

An index ear 186 is provided on push rod 171 to trip the throw arm 188 on switch 189 when the piston rod 169 is retracted to its innermost position by the operation of cylinder 165, and a similar index ear 190 is provided on push rod 171 to trip the throw arm 191 on switch 192 when the piston rod 169 is extended to its outermost position (the chain line representation in FIG. 11) by the operation of cylinder 165.

It should now be apparent that actuation of the cylinder 155 effects movement of the shuttle head 152 longitudinally of itself along the slide bar 179, and that actuation of cylinder 165 effects vertical movement to slide bar 179, thus selectively raising or lowering the shuttle head 152. The purpose of translating the shuttle head longitudinally of itself, of raising and lowering the shuttle head, as well as the interaction and function of the various switches 162, 164, 189 and 192 will hereinafter become apparent in conjunction with the description of the operation of apparatus 75.

Before proceeding with a further description of the remaining subassemblies incorporated in the bias cutting apparatus 75, it should be noted that the shuttle head 152 may be provided with an internal plenum chamber 193 (FIG. 26) that communicates with the exterior environment through a plurality of apertures 194 in the lower face wall 195. The chamber 193 also communicates with a remote vacuum source (not shown) by a vacuum conduit 198, one end of which is connected to a coupling neck 199 (FIG. 11) and the other end of which is connected to a flow control mechanism 200.

As best seen in FIGS. 10 and 27, the flow control mechanism 200 constitutes a gate plate 201 mounted to swing on a support pin 202. The flexible conduit 198 is attached to a coupling neck 203 on gate plate 201, and the coupling neck 203 is selectively registrable with a conduit 204 communicating with a source (not shown) of subatmospheric pressure and a conduit 205 communicating with the atmosphere, or, if desired, with a source of pressurized air. The conduits 204 and 205 preferably terminate at a header plate 206, supported from the frame 82, against which the gate plate 201 is juxtaposed to swing about pin 202 in response to a double-acting control cylinder 208.

The cylinder 208 may be anchored, as by a pivot pin 209, to an arm 210 that is secured to, and extends laterally of, the header plate 206, and a clevis 211 on the end of the piston rod 212 is secured, as by pin 213, to an ear 214 on the gate plate 201. Here, too, the desirability of applying at least subatmospheric pressure to the shuttle head 152 will be more fully understood after the operational sequence of the apparatus 75 has been explained.

As best seen from FIG. 10, the guillotine means 150 is located between the lead-in mechanism 80 and the transfer means 125.

As best seen in FIG. 19, the guillotine means 150 is supported from the main frame 82 of the apparatus 75 by a C-shaped subframe plate 215 that is secured to, and extends upwardly from, the quadrant plate 263 of the main frame 82. Referring now to FIGS. 17 and 18, one face 216 on the overhead portion 215a of the C-shaped subframe plate 215 is provided with an opposed pair of laterally spaced, parallel gibs 217 and 218 which, in combination with a wear plate 219 secured to the face 216, present the bearing surfaces along which an upper blade holder 220 can reciprocate. One end of a connector arm 221 is secured to the holder 220, as by bolts 222, and the opposite end is threaded onto the end of a first piston rod 223 and secured thereto, as by lock nut 224. The piston rod 223 is extended and retracted to lower and raise the blade holder 220 by virtue of a double-acting cylinder 225. A second piston rod 226 extends outwardly of the cylinder 225 in diametric opposition to the first piston rod 223 and moves therewith.

A disk 228 is selectively positionable along the second piston rod 226, as by the nuts 229 and 230, and is located to trip the throw arm 231 on switch 232 when the holder 220 is in its uppermost position. The disk 228 similarly trips the throw arm 223 on switch 234 when the holder is in its lowermost position (as indicated by the chain line representation in FIGS. 17 and 18).

When the holder 220 is in its uppermost position, a locking mechanism 235 is employed to preclude inadvertent descent of the holder 220. Specifically, a bore 236 in the connector arm 221 receives a plunger 238 which is reciprocated by a double-acting cylinder 239.

The cylinders 225 and 239 are both supported on an angle bracket 240 that is affixed to the overhead portion 215a of the subframe plate 215 by bolts 241 and 242, and the cylinder 239 is supported outwardly of the angle bracket 240 by a plurality of legs 243 to afford a means for actuating the switch 244. As depicted in FIG. 18, the plunger 238, which is slidably received through the angle bracket 240, is secured, as by the thread-locknut arrangement 245, to the piston rod 246 controlled by cylinder 239. A disk 248 may be secured to the plunger 238 to trip the throw arm 249 on switch 244.

With the plunger 238 received in bore 236, as depicted in FIG. 18, the holder 220 is immobilized. However, when the plunger 238 is retracted by cylinder 239 to disengage from the bore 236, the cylinder 225 may drive the holder 220 downwardly.

A clamp bracket 250 is removably mounted on the holder 220 by a plurality of tightening bolts 251 to maintain an upper blade 252 in a recess 253 provided on holder 220. The blade 252 is oriented to effect a shearing action against a lower blade 254 secured to the lower, or bed, portion 215b of the C-shaped subframe plate 215 by bolts 255. As depicted in FIG. 17, the cutting edge 256 of the lower blade 254 may be tilted with respect to the cutting edge 258 of the upper blade 252 in order to obtain a progressive shearing action when the upper blade 252 is driven downwardly past the lower blades 254 (the chain line representation in FIG. 18) — a highly desirable feature when the ribbon 45 being severed by the guillotine means 150 is reinforced with wire.

The overhead portion 215a of the C-shaped subframe plate 215 is spaced upwardly of the lower portion 215b sufficiently to permit the shuttle head 152 to pass between the blades 252 and 254 when they are in their vertically separated position without interference, and in a manner hereinafter more fully described in conjunction with the operation of the bias-cutting apparatus 75.

Figure 28:
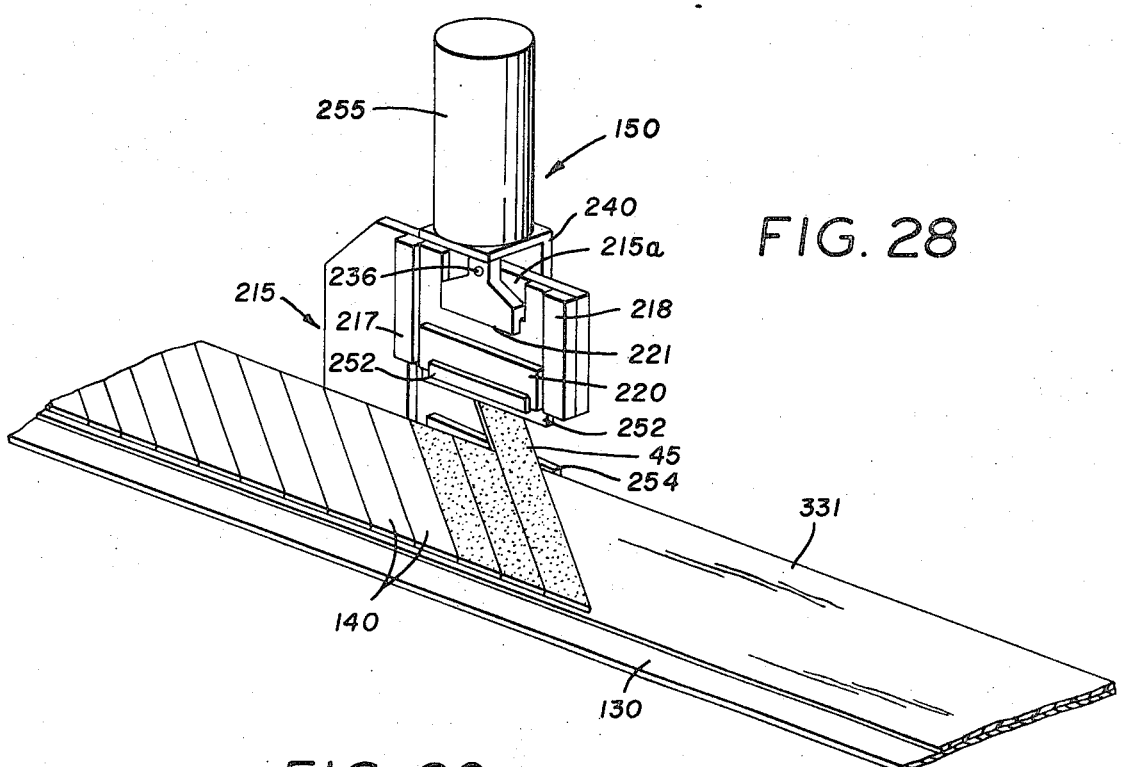
FIG. 28 is a schematic perspective of the successive strips deposited on the conveyor means presented by the assembly table and depicting the relationship of the successive strips to the guillotine but with the shuttle head being removed for purposes of clarity.
Figure 30:
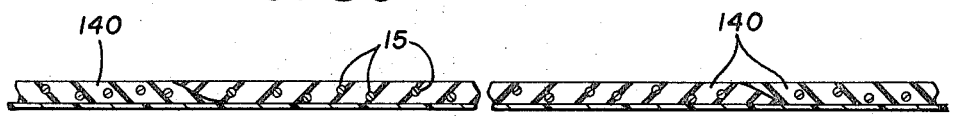
FIG. 30 is an enlarged cross section taken substantially on line 30—30 of FIG. 29.

The cutting edge 256 is oriented only slightly above the level of the conveyor belt 130 on table 135 so that as an elemental strip 140 is severed from the ribbon 45 by the action of the guillotine means 150, as schematically depicted in FIG. 28, it will preferably be resting upon the conveyor belt 130 or be only slightly thereabove.

The assembly table 135 is preferably adapted to be swung about a vertical axis 260 for selective angular orientation transversely with respect to the longitudinal alignment of the table 88 in lead-in mechanism 80 and the shuttle head 152 of the transfer means 125. The vertical axis 260 passes through the center line of the guillotine means 150, as represented in FIG. 10, and the center line of the bearing shaft 261 (FIG. 13) about which the assembly table 135 swings. The bearing shaft 261 extends upwardly into a sleeve 262 secured within the table 135 and downwardly through the quadrant plate 263 and into a collar 264 attached to the underside of the quadrant plate 263. The quadrant plate is supported upwardly of the main frame 82, as by blocks 265.

The end of the table 135 most remote from the bearing shaft 261 may be supported on a plurality of casters 266 dependingly supported from beneath the table 135. As such, the table can be swung about axis 260 to select the angular orientation of the table with respect to the direction in which the ribbon 45 is oriented on the table 88 of the lead-in mechanism 80 and thus the direction in which the elemental strips 140 are deposited on the table by the shuttle head 152 of the transfer means 125.

By supporting the guillotine means 150 from the main frame 82 in such a position that the movable upper blade 252 spans and is operable along the axis 260 about which the table 135 can be swung, no matter what angular orientation of the table 135 is selected, the successive elemental strips 140 will be severed from the ribbon 45 by guillotine means 150 along a plane parallel to the direction in which the strips 140 are indexed by conveyor 130, as will be hereinafter more fully explained.

Although a belt 145 produced by the subject bias-cutting apparatus 75 may be readily adapted for numerous end uses, one of the primary uses will be as a tire ply strip which can be hooped without waste. For example, by selecting the angular disposition of the table 135, by selecting the length of each elemental strip 140 and by selecting the number of elemental strips forming the belt 145, one can predetermine the circumference of the hooped tire ply, its width and the angular orientation of the reinforcing filaments 15 therein.

Turning now to the construction of the table 135, a pair of angles 286 and 288 extend fully along the side thereof and constitute the frame of the table. A first drive roll 289 is journaled in a pair of bearing pedestals 290 carried on the frame angles 286 and 288 at one end of the table, and a second drive roll 291 is journaled in a pair of bearing pedestals 292 carried on the frame angles 286 and 288 at the opposite end of the table 135. The endless conveyor belt 130 passes over both drive rolls to be indexed thereby.

A portion of the upwardly directed, or receiving, surface of the belt 130 slides along a support pan 293 disposed upwardly of the side frame angles 286 and 288 by a plurality of brackets 294. At least that portion of the table 135 which will be located beneath the shuttle head 152 irrespective of the angular orientation of the table with respect thereto has a boxed slideway 295 upon which the belt 130 can slide. A plurality of magnets 296 are located within the boxed slideway 295 to assist in maintaining the elemental strips 140 properly positioned on the conveyor belt 130, particularly when the elemental strips 140 are reinforced with steel filaments 15.

Figure 13:
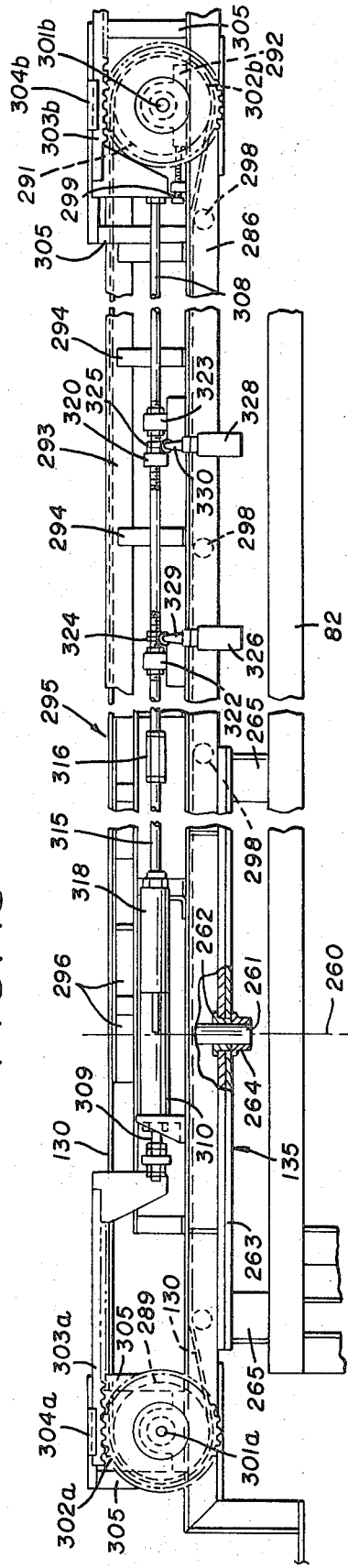
FIG. 13 is an enlarged side elevation taken substantially on line 13—13 of FIG. 10 and intended to depict the mechanism by which the conveyor means on the assembly table is indexed.

The downwardly directed, or return, portion of the belt 130 may be supported on a plurality of laterally disposed rollers 298 spaced longitudinally along the table 135. In order properly to tension the belt 130 it is highly desirable to provide for longitudinal adjustment of the pedestal bearings in which at least one drive roll is journaled. As shown in FIG. 13, a set screw 299 may be employed to adjust the longitudinal location of the pedestal bearings 292 and thereby select the desired tension in the conveyor belt 130.

In order to effect precise indexing of the conveyor belt 130, both drive rolls 289 and 291 should be simultaneously driven through the required degree of angular rotation. In the preferred embodiment this result has been achieved by operatively connecting overrunning clutches 300a and 300b to the respective shafts 301a and 301b on which the drive rolls 289 and 291 are secured for rotation. The clutches 300a and 300b are, in turn, operatively connected to pinions 302a and 302b rotatably carried on the respective shafts 301a and 301b. The pinions 302a and 302b are rotated by racks 303a and 303b, respectively, and each is preferably slidable in its own guide 304a and 304b to assure stability and alignment. The guides 304a and 304b may, as best seen in FIG. 13, by supported on a plurality of stanchion posts 305 that extend upwardly from the frame angle 286.

Each rack 303a and 303b is fixed to its own throw rod 306 and 308, respectively. When indexing the conveyor belt 130 to the left, as viewed in FIG. 10, the throw rod 306 is operatively connected to the piston rod 309 of the forward drive cylinder 310. As shown in FIG. 10, and for a purpose that will hereinafter become apparent, the throw rod 306 may constitute the first piston rod for the double-acting return cylinder 311, and with the two cylinders 310 and 311 mounted side by side on brackets 312 and 313 attached to, and extending laterally outwardly of, the frame angle 286, the throw rod 306 and piston rod 309 may be interlocked for simultaneous movement by a yoke 314.

The throw rod 308 connects the rack 303b to the second piston rod 315 of the return cylinder 311, as by the coupling 316.

It has been found desirable to effect a smooth, steady, incremental translation to the conveyor belt 130 in order to achieve the indexing precision required for accurately positioning the successive elemental strips 140 on the conveyor belt 130. Such shock-free movement can be achieved even with the use of pneumatic cylinders by employing a check cylinder 318 in combination with the drive cylinder 310 to cushion and bleed the pneumatic surge when effecting the forward stroke of racks 303a and 303b.

On the return stroke of the racks a lesser mass is involved and the cylinder 311 can be actuated to extend rod 315 and retract rod 306. As such, it would appear that cylinder 311 need only be single-acting, but by employing a cylinder that is double-acting, the nozzle 319 communicating with the second chamber can be restricted to effect a cushioning action against the energy of the return stroke.

A finger 320 is secured to throw rod 308 and is slidable along a guide rod 321 supported from the frame angle 286 by outrigger arms 322 and 323. Stops 324 and 325 are selectively positionable along the guide rod 321 for engagement by the finger 320 to determine the forward and reverse throw of the racks 303a and 303b. In addition, a pair of switches 326 and 328 are mounted on the frame angle 286 so as to be adjustably positionable along the length of the frame angle 286 for operation by the finger 320. Accordingly, when the cylinder 310 has extended the rod 309 to effect the desired rotation of the pinions 302a and 302b, the finger 320 will trip the throw arm 329 on switch 326. Conversely, when the cylinder 311 has extended rod 315 to reciprocate the racks 303a and 303b in preparation for the next indexing cycle, the finger 320 will trip the throw arm 330 on switch 328. The function of switches 326 and 328 will also hereinafter become apparent in view of the description as to the operation of the bias-cutting apparatus 75.

Although it has not been shown on the drawings, a take-up roll may well be provided to the left of the table 135, as viewed in FIG. 10, should a belt 145 of any length be fabricated.

Referring again to FIG. 10, it will be noted that a sheet of plastic film 331 is disposed between the belt 145 and the conveyor 130.

Although a sheet of film may be desirably employed to preclude any tendency of the belt 145 to stick to the surface of the conveyor 130, when the belt 145 is wound onto a take-up roll such a sheet of film, or other means, must be employed between the successive convolutions in order to obviate adhesion therebetween. The sheet of film 331 may well be drawn onto the conveyor 130 from a supply roll (not shown) located generally to the right of the transfer means 125, as viewed in FIG. 10.

OPERATION OF THE BIAS-CUTTING APPARATUS 75

The operating cycle of the bias-cutting apparatus 75 will be described by beginning with the ribbon 45 positioned on the lead-in table 88, a position in which the ribbon is retained against withdrawal by the friction brake means 120 and a position in which accurate orientation is achieved by the filler plates 83a and 84a which embrace the sides of the ribbon 45. In response to a signal that will hereinafter be explained, the shuttle head 152 of the transfer means 125 is translated longitudinally of itself from its elevated position above the assembly table 135 (FIGS. 11 and 12) to a position above the lead-in table 88, as represented in FIG. 19. This longitudinal translation of the shuttle head 152 is effected by actuation of cylinder 155 to retract piston rod 156.

Figure 20:
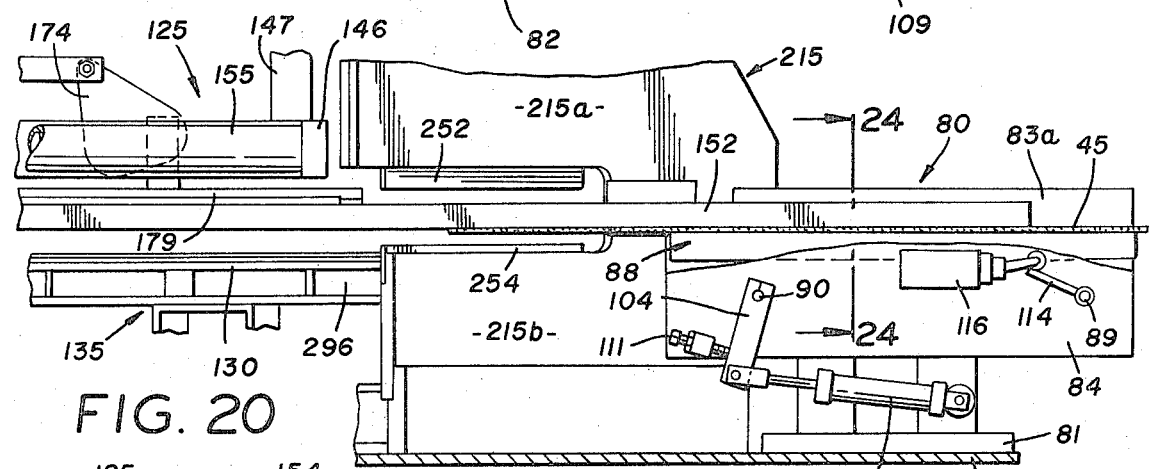
FIG. 20 is a partial area of FIG. 19 depicting an operational sequence subsequent to that represented in FIG. 19 — i.e., the lead-in table having been elevated to press the ribbon against the lower surface of the shuttle head.

When the shuttle head 152 has been translated to the desired extent and is properly positioned over the lead-in table 88, the trolley 158 trips switch 164 (FIG. 12) to actuate cylinder 109 (FIG. 19), thereby elevating the lead-in table 88 to bring the ribbon 45 into juxtaposition with the lower face wall 195 on shuttle head 152 (FIGS. 20 and 24). The elevation of the lead-in table 88 swings the engaging arm 114 against throw arm 115 to trip switch 116.

Switch 116 sequentially actuates cylinders 208 and 155. Cylinder 208 is actuated to extend piston rod 212 and swing the gate plate 201 from the solid line representation in FIG. 27 to the chain line representation therein, thereby registering conduit 205 communicating with a source (not shown) of subatmospheric pressure with flexible conduit 198 that communicates with the plenum chamber 193 within the shuttle head 152. Because a plurality of apertures 333 in the upwardly directed face 334 of table 88 communicate with the atmosphere through the open passageway 335 within table 88, transfer in the support of the ribbon 45 from the lead-in table 88 to the shuttle head 152 is thereby readily effected. It should also be apparent that when the reinforcing filaments 15 are steel wire, or its equivalent, the holding action may well be accomplished by electromagnetic means within the shuttle head 152. Another holding means with which satisfactory results have been obtained comprises a plurality of needlelike pins depending from the shuttle head prickingly to engage the ribbon.

Figure 21:
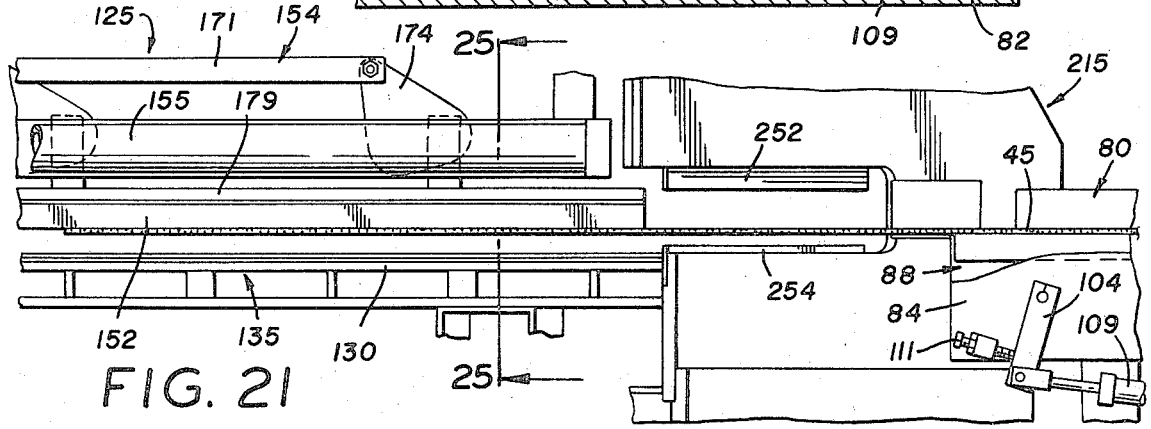
FIG. 21 is a view simlar to FIG. 20 depicting an operational sequence subsequent to that represented in FIG. 20 — i.e., the shuttle head having been reversely translated to withdraw a predetermined length of ribbon from said lead-in table.

After the ribbon 45 has been firmly secured against the shuttle head 152, as by the pressure differential between the outer atmosphere and the subatmospheric pressure within the plenum chamber 193, the sequential actuation of cylinder 155 translates the shuttle head longitudinally of itself in a reverse direction — i.e., from its position over the lead-in table 88 (FIGS. 20 and 24) to an elevated position above the assembly table 135 (FIG. 21).

Figure 29:
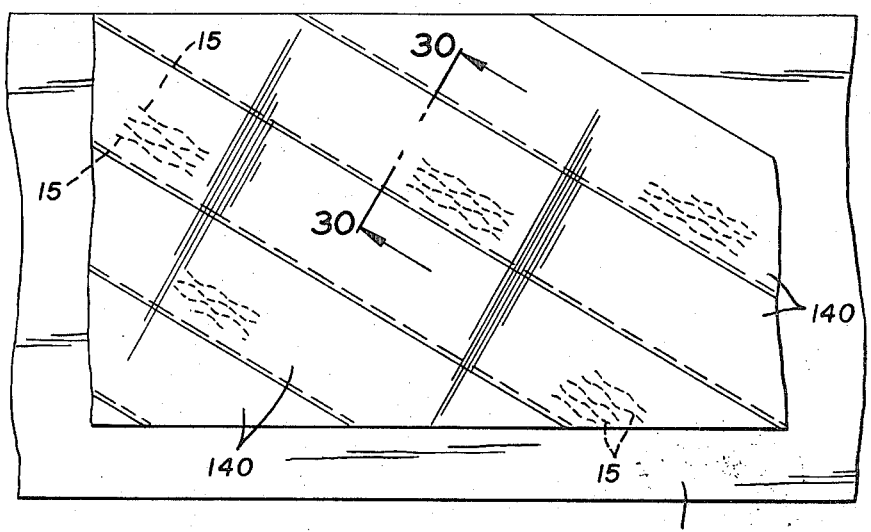
FIG. 29 is a top plan of the successive strips on the assembly table.

The reverse translation of shuttle head 152 withdraws an accurately predetermined length of ribbon 45 from the lead-in table 88 and positions it at a precise location above the assembly table 135 (FIG. 25). When the shuttle bar 152 withdraws a precisely predetermined length of ribbon 45 the trolley 158 trips switch 162 (FIG. 12) simultaneously to actuate cylinders 109 and 165 (FIG. 22). Cylinder 109 is actuated to lower the lead-in table 88, and cylinder 165 (which is best seen in FIG. 11) is actuated to lower the shuttle head 152 and thereby positively deposit the ribbon at a precisely predetermined location on the assembly table 135 (FIGS. 26 and 29).

When the shuttle head 152 has lowered to deposit the ribbon 45 on the assembly table 135, the index ear 186 swings the throw arm 191 to trip switch 192 (FIG. 11), thereby releasing the locking mechanism 235 (FIg. 18). That is, the cylinder 239 is actuated to withdraw the plunger 238 from the bore 236 in the connector arm 221. As the locking mechanism 235 is released, the disk 248 swings the throw arm 249 to trip switch 244 and thereby actuate cylinder 225 to drive the upper blade 252 downwardly past the lower blade 254 (to the chain line position depicted in FIG. 18) and shearingly sever an elemental strip 140 from the ribbon 45.

Upon completion of the severing action by the guillotine means 150 the disk 228 swings the throw arm 233 to trip switch 234. Switch 234 reversely actuates cylinder 225 to raise the blade 252, and as it reaches its uppermost position the disk 228 swings throw arm 231 to trip switch 232.

Switch 232 actuates cylinders 208 (FIG. 27) and 239 (FIG. 18). Cylinder 208 swings the gate plate 201 to bring the flexible conduit 198 into registry with conduit 205 communicating with the atmosphere, or a source of pneumatic pressure, and thereby release the subatmospheric pressure within pleunm 193. When the reinforcing filaments 15 are steel, or an equivalent material, the magnetic field created by magnets 296 beneath the conveyor 130 on table 135 firmly retain the elemental strip 140 in its proper position on the conveyor 130. Cylinder 239 extends the plunger 238 into the bore 236, thereby locking the blade 252 of the guillotine means 150 in its uppermost position.

As the plunger 238 seats within the bore 236, the disk 248 releases the throw arm 249 on switch 244 to signal the actuation of cylinder 165 for the retraction of piston rod 169, thereby elevating the shuttle head 152 (FIGS. 11 and 12). Upon elevation of the shuttle head 152, the index ear 186 swings the throw arm 188 to trip switch 189. Switch 189 actuates the drive cylinder 310 (FIGS. 10 and 13) to index the conveyor 130. Completion of the indexing movement is signaled when finger 320 trips siwtch 326. Switch 326 actuates cylinder 311 to return the racks 303a and 303b in preparation for the next indexing operation. The return of the racks causes finger 320 to trip switch 328 and actuate cylinder 155. Switch 328 thus provides the signal which initiates the translation of shuttle head 152 from its elevated position above the assembly table 135 to its position above lead-in table 88, thereby beginning anew the operational cycle of the bias-cutting apparatus 75 herein described.

Thus, the subject invention provides a new and novel apparatus and method by which to encapsulate reinforcing means within a ribbon of elastomeric material and form continuous, or, selectively, discontinuous, lengths of reinforcing fabric in which the reinforcing means is disposed at a predetermined bias from elemental strips of such ribbon which are precisely and accurately positioned to effect stitching of the successive elemental strips.

I claim:

1. Apparatus for making reinforced fabric, from a ribbon of uncured elastomeric material in which a reinforcement is encapsulated comprising; a lead-in table and an assembly table means, guide means preliminarily to orient a predetermined length of ribbon on said lead-in table, a shuttle head, means to translate said shuttle head longitudinally of itself between a position over said assembly table and a position over said lead-in table, means to effect relative vertical movement between said lead-in table and said shuttle head to bring said shuttle head into juxtaposition with the ribbon on said lead-in table, means carried by said shuttle head positively to engage and grip substantially the full extent of a predetermined length of ribbon received on said lead-in table, means to effect relative vertical movement between said shuttle head and said assembly table means in order accurately to deposit the predetermined length of ribbon on said assembly table means and guillotine means to sever the strip of predetermined length deposited on said assembly table means from the ribbon.

2. Apparatus, as set forth in claim 1, in which an indexing means stages the predetermined length of severed ribbon through a preselected distance.

3. Apparatus for making reinforced fabric from a ribbon of uncured elastomeric material in which a reinforcement is encapsulated comprising; a lead-in table and an assembly table means having a frame supported on a base for selective positioning about an axis, guide means preliminarily to orient the ribbon received on said lead-in table, a shuttle head, means to translate said shuttle head longitudinally of itself between a position over said assembly table and a position over said lead-in table, means carried by said shuttle head to grip at least a portion of the ribbon received on said lead-in table, means by which the shuttle head accurately deposits a strip of ribbon having a predetermined length on said assembly table means, guillotine means to sever the strip of predetermined length deposited on said assembly table means from the ribbon, said guillotine means having blade means spanning said axis to operate therealong and conveyor means mounted on said frame to receive and index said strips.

4. Apparatus, as set forth in claim 1, in which the means carried by said shuttle head to grip the ribbon comprises a plenum chamber within said shuttle head and apertures communicating between said plenum chamber and the exterior of said shuttle head, said apertures being located to engage the ribbon.

5. Apparatus as set forth in claim 4, in which brake means retain the ribbon received on said lead-in table against retraction.

6. Apparatus, as set forth in claim 4, in which a valve means provides communication between the plenum chamber and a source of subatmospheric pressure and, selectively, a source of at least atmospheric pressure.

7. Apparatus for making reinforced fabric from a ribbon of uncured elastomeric material in which a reinforcement is encapsulated comprising; a lead-in table and an assembly table means, guide means preliminarily to orient the ribbon received on said lead-in table, a shuttle head, means to translate said shuttle head longitudinally of itself between a position over said assembly table and a position over said lead-in table, a plenum chamber within said shuttle head and apertures communicating between said plenum chamber and the exterior of said shuttle head, said apertures being located to engage at least a portion of the ribbon received on said lead-in table, a valve means to provide selective communication between the plenum chamber and a source of subatmospheric pressure and, selectively, a source of at least atmospheric pressure, control means to actuate said valve means in response to the raising of said lead-in table to apply subatmospheric pressure to said plenum chamber, means to raise and lower said lead-in table, said lead-in table being raised to position the ribbon received thereon in immediate proximity to the apertures in said shuttle head, means by which the shuttle head accurately deposits a strip of ribbon having a predetermined length on said assembly table means and guillotine means to sever the strip of predetermined length deposited on said assembly table means from the ribbon.

8. Apparatus, as set forth in claim 7, in which said control means actuates said valve means after the guillotine means has severed the strip from the ribbon to release the subatmospheric pressure in said plenum chamber.

9. Apparatus for making reinforced fabric from a ribbon of uncured elastomeric material in which a reinforcement is encapsulated comprising; a lead-in table and an assembly table means, guide means preliminarily to orient the ribbon received on said lead-in table, a shuttle head, a slide bar, track means on said slide bar, means on said shuttle head to permit said shuttle head to move along said track means, an operating mechanism to effect the moving of said shuttle head longitudinally of itself between a position over said assembly table and a position over said lead-in table, means carried by said shuttle head to grip at least a portion of the ribbon received on said lead-in table, means to raise and lower the suttle head, said shuttle head being lowered accurately to deposit a predetermined length of ribbon on said assembly table means, and guillotine means to sever the strip of predetermined length deposited on said assembly table means from the ribbon.

10. Apparatus, as set forth in claim 9, in which magnetic means retain the ribbon on the assembly table means.

11. Apparatus as set forth in claim 9, in which said operating mechanism comprises a cylinder means interconnected to said shuttle head by a pitman.

12. Apparatus, as set forth in claim 11, in which the slide bar is carried on rocker arms and means are provided for rocking said rocker arms to effect a raising and lowering of said shuttle head.

13. Apparatus, as set forth in claim 3, in which a locking means effects selective immobility of the blade means.

14. Apparatus, as set forth in claim 13, in which control means actuates the locking means to permit the severing action of said blade means in response to the deposit of the ribbon on said assembly table means.

15. Apparatus, as set forth in claim 3, in which said conveyor means is received over drive rolls located at opposite end portions of said assembly table means and means are provided simultaneously to rotate said drive rolls through a predetermined degree of angular rotation.

16. Apparatus, as set forth in claim 15, in which an overrunning clutch means is connected to each drive roll, a pinion is connected to each clutch means and an individual rack engages each pinion, first and second cylinder means are connected to both said racks, said first cylinder means being operative simultaneously to displace both racks in one direction to turn said drive rolls through said clutch means and thereby index said conveyor means, and said second cylinder means being operative to displace both said racks in an opposite direction to rotate only said pinions preparatory to the subsequent indexing operation.

17. Apparatus, as set forth in claim 16, in which a check cylinder communicates with said first cylinder means to effect a smooth, steady motion to said conveyor means as it is being indexed.

* * * * *